(12) United States Patent
Sacks et al.

(10) Patent No.: US 10,994,520 B2
(45) Date of Patent: May 4, 2021

(54) DECORATED DENTAL APPLIANCES AND METHODS FOR PRODUCING SAME

(71) Applicant: DentaGrafix, LLC, Livingston, NJ (US)

(72) Inventors: Eric Marshall Sacks, Livingston, NJ (US); Matthew Fischer, West Orange, NJ (US)

(73) Assignee: DentaGrafix, LLC, Livingston, NJ (US)

( * ) Notice: Subject to any disclaimer, the term of this patent is extended or adjusted under 35 U.S.C. 154(b) by 0 days.

(21) Appl. No.: 16/784,113

(22) Filed: Feb. 6, 2020

(65) Prior Publication Data
US 2020/0254739 A1 Aug. 13, 2020

Related U.S. Application Data

(60) Provisional application No. 62/802,292, filed on Feb. 7, 2019.

(51) Int. Cl.
*B32B 3/00* (2006.01)
*B32B 27/08* (2006.01)
(Continued)

(52) U.S. Cl.
CPC .............. *B32B 27/08* (2013.01); *A61C 7/08* (2013.01); *B32B 27/32* (2013.01); *B32B 27/36* (2013.01);
(Continued)

(58) Field of Classification Search
CPC ......... B32B 27/08; B32B 27/10; B32B 27/32; B32B 27/36; A61C 7/08
See application file for complete search history.

(56) References Cited

U.S. PATENT DOCUMENTS 3,311,520 A * 3/1967 Michaelson ............ B32B 37/00
156/209
6,293,790 B1 * 9/2001 Hilliard .................... A61C 7/04
101/3.1
(Continued)

FOREIGN PATENT DOCUMENTS

CN 102950950 A 3/2013

OTHER PUBLICATIONS

International Search Report and Written Opinion issued by the Korean Intellectual Property Office dated Jun. 8, 2020 in International Patent Application No. PCT/US2020/017076 filed Feb. 6, 2020.

*Primary Examiner* — Elizabeth E Mulvaney
(74) *Attorney, Agent, or Firm* — Greenberg Traurig, LLP

(57) ABSTRACT

A method includes the steps of providing a disk, wherein the disk has a first side, a second side opposite the first side, and a profile, and wherein the disk includes an FDA-compliant plastic material that is configured to be formed into a dental appliance; providing a graphic part, wherein the graphic part includes: a first carrier film, and a graphic disposed on the first carrier film, providing a heat stamping press having a lower platen and an upper platen; positioning the disk on the lower platen; positioning the graphic part on the disk such that the graphic of the graphic part contacts a portion of the first side of the disk; and heat stamping the disk and the graphic part with the heat stamping press, thereby causing the graphic to fuse with the disk to produce a decorated disk.

11 Claims, 13 Drawing Sheets

(51) Int. Cl.
  *B32B 27/32* (2006.01)
  *B32B 27/36* (2006.01)
  *B32B 37/10* (2006.01)
  *A61C 7/08* (2006.01)

(52) U.S. Cl.
  CPC ........ *B32B 37/10* (2013.01); *B32B 2307/406* (2013.01); *B32B 2323/00* (2013.01); *B32B 2367/00* (2013.01); *B32B 2535/00* (2013.01)

(56) References Cited

U.S. PATENT DOCUMENTS

| | | |
|---|---|---|
| 7,201,575 B2 | 4/2007 | Adell et al. |
| 10,336,102 B2 * | 7/2019 | Cole .................... B41M 5/0064 |
| 2003/0008257 A1 * | 1/2003 | Tao ........................... C10L 5/44 |
| | | 431/288 |
| 2008/0003541 A1 * | 1/2008 | Leslie-Martin .......... A61C 5/00 |
| | | 433/215 |
| 2008/0138767 A1 * | 6/2008 | Kuo ........................ A61C 7/08 |
| | | 433/167 |
| 2012/0052458 A1 * | 3/2012 | Harman ................... A61C 7/00 |
| | | 433/6 |
| 2013/0078594 A1 * | 3/2013 | Leslie-Martin .......... A61C 7/08 |
| | | 433/6 |
| 2016/0015496 A1 | 1/2016 | Johnson et al. |
| 2018/0161251 A1 * | 6/2018 | Wang .................... C08F 220/18 |
| 2018/0271620 A1 * | 9/2018 | Rodriguez .............. B29C 41/46 |
| 2018/0333226 A1 | 11/2018 | Tsai et al. |
| 2018/0370096 A1 | 12/2018 | Fuchs et al. |

\* cited by examiner

DECORATED DENTAL APPLIANCES AND METHODS FOR PRODUCING SAME

CROSS-REFERENCE TO RELATED APPLICATION

This application is a Section 111(a) application relating to and claiming the benefit of commonly-owned, U.S. Provisional Patent Application No. 62/802,292, filed on Feb. 7, 2019, and entitled "DECORATED DENTAL APPLIANCES AND METHODS FOR PRODUCING SAME," the contents of which are incorporated herein by reference in their entirety.

FIELD OF THE INVENTION

The field of invention relates to dental appliances, such as retainers, aligners, and mouth guards. More particularly, the field of invention relates to dental appliances bearing customized graphics and methods for producing such appliances.

BACKGROUND OF THE INVENTION

Dental appliances, such as orthodontic retainers, mouth guards used for dental purposes, mouth guards worn during sleep for dental purposes, teeth aligners, teeth positioners, dental bleaching trays, and mouth splints for dental purposes, are worn by many people for a wide variety of reasons. Techniques exist to produce decorated dental appliances, but such techniques typically involve mixing a physical decoration, such as glitter, together with the material that will be used to form the dental appliance, resulting in a limited variety of available decorations.

SUMMARY OF THE INVENTION

In an embodiment, a method includes the steps of: providing a disk, wherein the disk has a first side, a second side opposite the first side, and a profile, and wherein the disk includes an FDA-compliant plastic material that is configured to be formed into a dental appliance; providing a graphic part, wherein the graphic part includes: a first carrier film, and a graphic disposed on the first carrier film; providing a heat stamping press having a lower platen and an upper platen; positioning the disk on the lower platen; positioning the graphic part on the disk such that the graphic of the graphic part contacts a portion of the first side of the disk; and heat stamping the disk and the graphic part with the heat stamping press, thereby causing the graphic to fuse with the disk to produce a decorated disk.

In an embodiment, the method also includes the steps of: providing a first silicone die and a second silicone die; prior to the step of positioning the disk on the lower platen, positioning the first silicone die on the lower platen; and prior to the step of positioning the disk on the lower platen, positioning the second silicone die on the upper platen. In an embodiment, at least one of the first silicone die and the second silicone die is textured.

In an embodiment, the method also includes the step of: prior to the step of positioning the disk on the lower platen, positioning a second carrier film on the lower platen, wherein the disk is positioned on the second carrier film.

In an embodiment, the profile of the disk is one of circular or square. In an embodiment, the graphic includes an FDA-compliant olefin-based resin.

In an embodiment, the method also includes the steps of: after operating the heat stamping press to produce the decorated disk, positioning the decorated disk in a cooling press; and operating the cooling press to cool the decorated disk.

In an embodiment, the first side of the disk has a first surface area, and the graphic has a graphic surface area that is less than the first surface area of the first side of the disk. In an embodiment, the graphic surface area is between 50% and 70% of the first surface area of the first side of the disk.

In an embodiment, the step of operating the heat stamping press includes operating the heat stamping press in accordance with a set of operational parameters, and wherein the set of operational parameters includes: a temperature of the lower platen, wherein the temperature of the lower platen is from 150° F. to 400° F., a temperature of the upper platen, wherein the temperature of the upper platen is from 350° F. to 600° F., an air pressure, wherein the air pressure is from 50 to 70 psi, and at least one dwell time, wherein the at least one dwell time is from 0.1 second to 10 seconds. In an embodiment, the at least one dwell time includes a first dwell time and a second dwell time, wherein the first dwell time is longer than the second dwell time, and the method also includes the step of inverting the disk and the graphic part between operating the heat stamping press for the first dwell time and operating the heat stamping press for the second dwell time. In an embodiment, the first dwell time is in a range of from 5 seconds to 10 seconds, and the second dwell time is in a range of from 1 second to 5 seconds.

In an embodiment, a device includes a disk having a first side, a second side opposite the first side, and a profile, wherein the first side has a first surface having a first surface area; and a graphic located within the first surface of the disk, wherein the graphic has a graphic surface area, wherein the graphic surface area is between 50% and 70% of the first surface area of the first side of the disk, and the disk includes an FDA-compliant plastic material that is configured to be formed into a dental appliance.

In an embodiment, the graphic surface area is between 50% and 60% of the first surface area of the first side of the disk. In an embodiment, the graphic includes an FDA-compliant olefin-based resin.

In an embodiment, the profile of the disk is a square. In an embodiment, the square has a side length of between 4 inches and 6 inches. In an embodiment, the square has a side length of 5 inches.

In an embodiment, the profile of the disk is a circle. In an embodiment, the circle has a diameter of between 100 millimeters and 150 millimeters. In an embodiment, the circle has a diameter of 125 millimeters.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DETAILED DESCRIPTION OF THE DRAWINGS

Figure 1A:
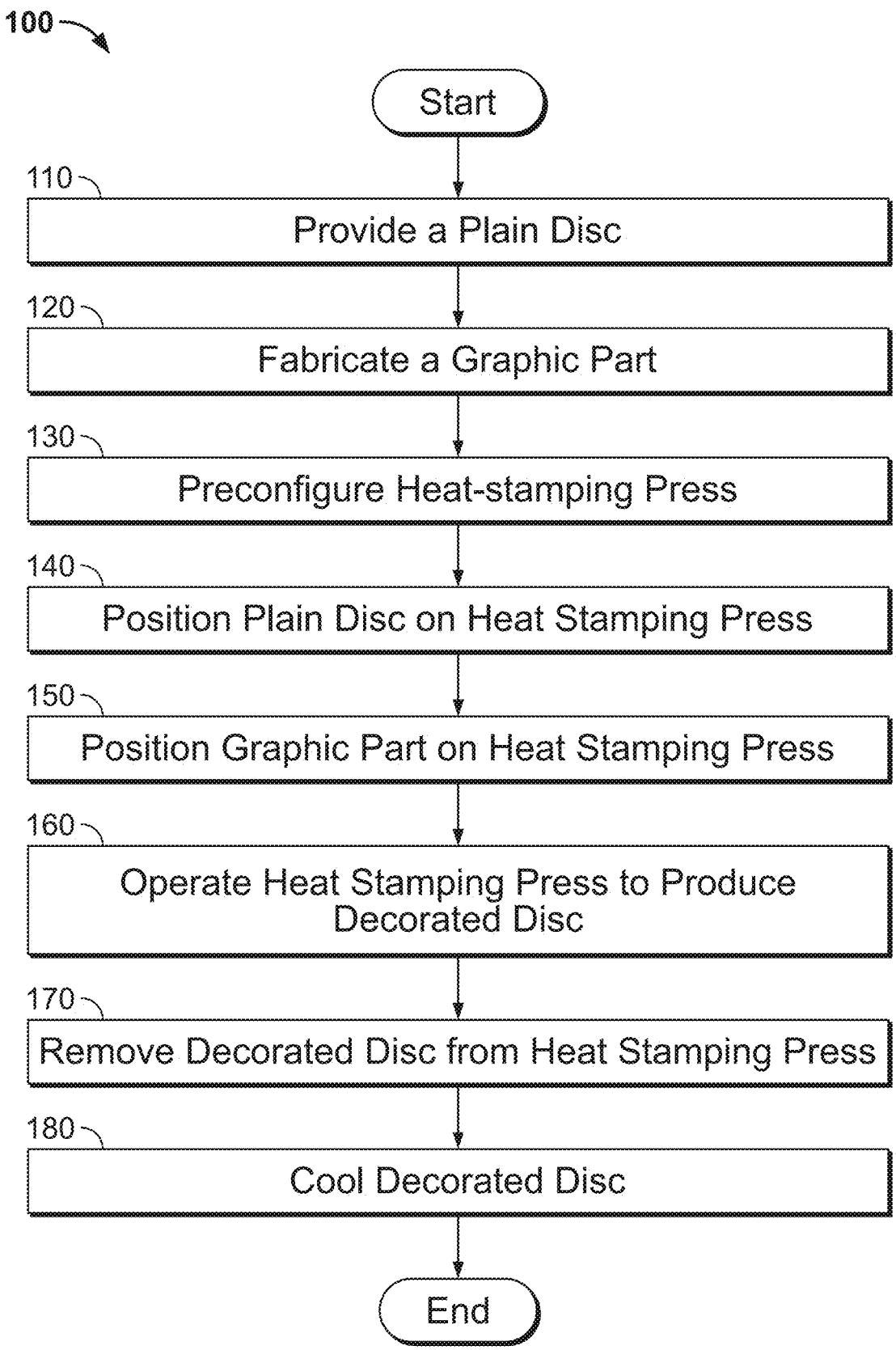
FIG. 1A shows a flowchart of a first exemplary method.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on." All ranges used herein are inclusive, i.e., include the stated upper and lower ends thereof as well as all values therebetween.

Unless otherwise defined, all terms (including technical and scientific terms used herein have the same meaning as commonly understood by one having ordinary skill in the art to which this invention belongs. It will further be understood that terms, such as those defined, in commonly used dictionaries, should be interpreted as having a meaning that is consistent with their meaning in the context of the relevant art and the present disclosure and will not be interpreted in an idealized or overly formal sense unless expressly defined.

The exemplary embodiments relate to devices for use in the fabrication of dental appliances, and methods of making and using such devices. In some embodiments, an exemplary device includes a plastic disk (e.g., having a circular or square profile) that is suitable for use in the fabrication of a dental appliance (e.g., an orthodontic retainer, a mouth guard used for dental purposes, a mouth guard worn during sleep for dental purposes, a teeth aligner, a teeth positioner, a dental bleaching tray, a mouth splint for dental purposes, etc.). In some embodiments, an exemplary device includes such a plastic disk having a graphic impregnated therein. The exemplary embodiments also relate to methods for making such disks.

FIG. 1 shows a flowchart of a first exemplary method 100 for making a decorated plastic disk that is suitable for use in the fabrication of dental appliances. In step 110, a plain disk is provided. In some embodiments, the plain disk is square. In some embodiments, the square plain disk has a side length of five inches. In some embodiments, the square plain disk has a side length of 125 millimeters. In some embodiments, the plain disk is circular. In some embodiments, the circular plain disk has a diameter of five inches. In some embodiments, the circular plain disk has a diameter of between 100 millimeters and 150 millimeters, or of 120 millimeters, or of 125 millimeters. In some embodiments, the plain disk has a thickness of between 0.020" and 0.120", or of 0.020", or of 0.030", or of 0.040", or of 0.060", or of 0.080", or of 0.120". In some embodiments, the plain disk comprises a material that is compliant with FDA requirements for dental plastics. In some embodiments, the plain disk comprises a material that is commercialized by Dentsply Sirona of York, Pa. under the trade name ESSIX (hereinafter "ESSIX Material"). In some embodiments, the plain disk is suitable for use by a dental professional in the fabrication of patient-specific dental appliances such as such as orthodontic retainers, mouth guards used for dental purposes, mouth guards worn during sleep for dental purposes, teeth aligners, teeth positioners, dental bleaching trays, and mouth splints for dental purposes. FIG. 2A shows an exemplary plain disk 210 that is square. FIG. 2B shows an exemplary plain disk 220 that is circular. In some embodiments, such as those illustrated in FIGS. 2A and 2B, the plain disk is clear. In some embodiments, the plain disk 210 or 220 is transparent. In some embodiments, the plain disk 210 or 220 is translucent. In some embodiments, the plain disk 210 or 220 is opaque. In some embodiments, the plain disk 210 or 220 is colored.

In step 120, a graphic part is fabricated. In some embodiments, the graphic part includes a carrier film that comprises an FDA-compliant material and a graphic that is disposed on the carrier film and that comprises one or more FDA-compliant resins. In some embodiments, the carrier film includes polyethylene terephthalate ("PET"). In some embodiments, the graphic comprises an olefin-based material that is suitable for transfer onto and fusion with a product comprising polyethylene or polypropylene. In some embodiments, the graphic comprises the olefin-based material commercialized under the trade name POLYFUZE by Polyfuze Graphics Corporation of Clarkdale, Ariz. (hereinafter "POLYFUZE Material"). In some embodiments, the graphic is applied to the carrier film by heat stamping. In some embodiments, the graphic part includes a pattern that is sized to overlay less than all of the plain disk, causing the graphic part to include a graphic portion and a plain portion. In some embodiments, the carrier film forms a substrate underlying multiple ones of the graphic part. In some embodiments, the carrier film is provided in a roll underlying multiple ones of the graphic part.

Figure 3A:
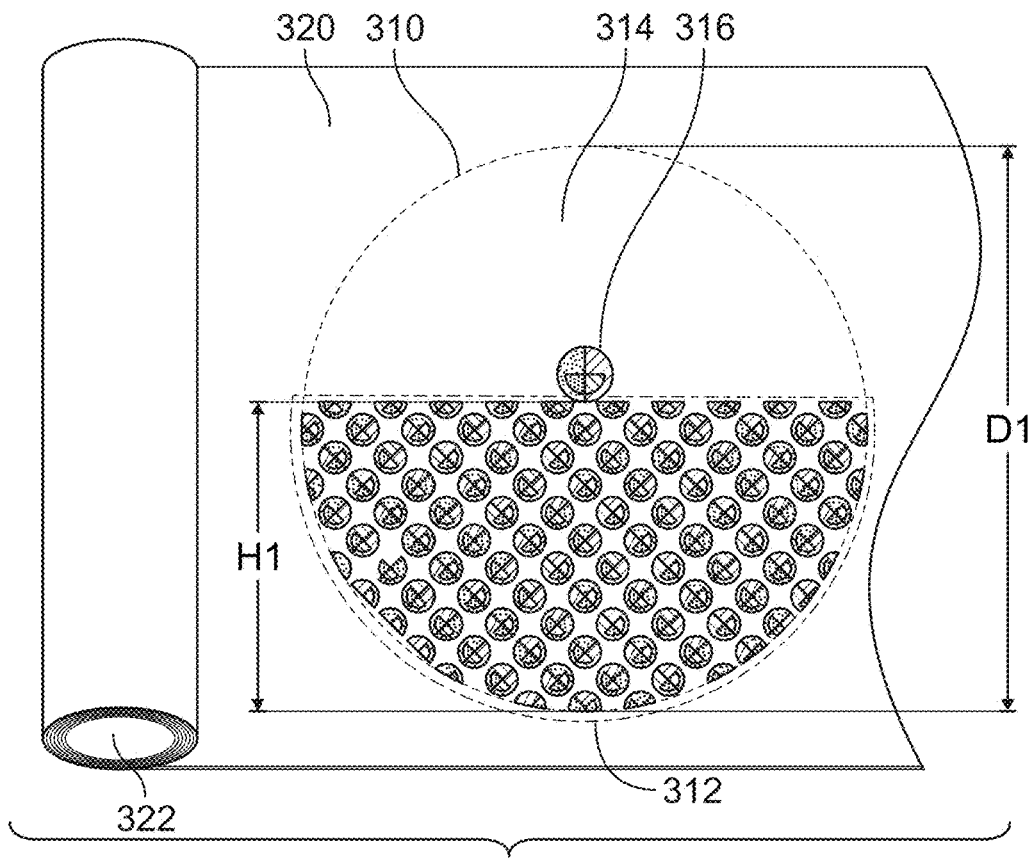
FIG. 3A shows a first exemplary graphic part that is suitable for use during the performance of the exemplary methods of FIGS. 1A, 1B, 15A, and 15B.

FIG. 3A shows a first exemplary graphic part 300. It will be apparent to those of skill in the art that the specific decorative illustrations of the graphic part 300 shown in FIG. 3A are only exemplary and that any number of different decorative illustrations may be used (for example, but not limited to, logos, sporting equipment, fictional characters, words, etc.). In some embodiments, the graphic part 300 includes a graphic 310 disposed on a carrier film 320. In some embodiments, the carrier film 320 forms a roll 322 containing at least one of the graphic 310. FIG. 3A shows a dashed line defining the graphic 310; however, this line is included for illustration purposes to show the bounds of the graphic 310 and is not, itself, an element of the graphic part 300. In some embodiments, the graphic 310 includes a patterned portion 312, a plain portion 314, and an accent graphic 316. In some embodiments, the graphic 310 has a diameter D1 as shown in FIG. 3A. In some embodiments, the graphic 310 has a diameter D1 of 5". In some embodiments, the graphic 310 has a diameter D1 of 120 mm.

Continuing to refer to FIG. 3A, a dash-dotted line is shown surrounding the boundary of the patterned portion 312; however, this line is included for illustration purposes to show the bounds of the patterned portion 312 and is not, itself, a physical element of the graphic part 300. In some embodiments, the patterned portion 312 is sized to overlay between 50% and 100% of the plain disk. In some embodiments, the patterned portion 312 is sized to overlay between 50% and 90% of the plain disk. In some embodiments, the patterned portion 312 is sized to overlay between 50% and 80% of the plain disk. In some embodiments, the patterned portion 312 is sized to overlay between 50% and 70% of the plain disk. In some embodiments, the patterned portion 312 is sized to overlay between 50% and 60% of the plain disk. In some embodiments, the patterned portion 312 is sized to overlay between 60% and 65% of the plain disk. In some embodiments, the patterned portion 312 is sized to overlay about 55% of the plain disk. In some embodiments, the patterned portion 312 is sized to overlay 55% of the plain disk. In some embodiments, the patterned portion 312 is sized to overlay about 60% of the plain disk. In some embodiments, the patterned portion 312 is sized to overlay 60% of the plain disk. In some embodiments, the plain disk 210 is a square having a 5" side length and the pattern occupies a portion of the graphic overlay that is a rectangle having a long side length of 5" and a short side length of 2.75". In some embodiments, the plain disk 210 is a square having a side length of between 4" and 6". In some embodiments, the patterned portion 312 has a height H1 and occupies a portion of the graphic 310 that is a major segment of a circle having a diameter D1 defined by a chord that is a distance H1 from the opposite side of the circle. In some embodiments, the distance H1 is 2.75". In some embodiments, the distance H1 is 72 mm. FIG. 3A shows such a graphic 310. In some embodiments, the graphic 310 is a circle having a diameter of 120 mm and the patterned portion 312 occupies a portion of the graphic 310 that is a major segment of a circle having a 120 mm diameter defined by a chord that is 72 mm from the opposite side of the circle, as a result of which the patterned portion 312 occupies approximately 62.6% of the surface area of the graphic 310. The plain portion 314 is the remaining portion of the graphic 310 that is not the patterned portion 312. It will be apparent to those of skill in the art that the dimensions shown in FIG. 3A are only exemplary.

Continuing to refer to FIG. 3A, in some embodiments, the accent graphic 316 is positioned within the plain portion 314. More particularly, in some embodiments, the accent graphic 316 is positioned at a location adjacent to the boundary between the patterned portion 312 and the plain portion 314. In some embodiments, the accent graphic 316 is centered along the boundary between the patterned portion 312 and the plain portion 314. In some embodiments, the accent graphic 316 is larger than individual elements comprising a pattern that is formed in the patterned portion 312. In one non-limiting example, the patterned portion 312 includes a pattern of baseballs and the accent graphic 316 is a larger baseball. In the embodiment shown in FIG. 3A, in which the graphic part 300 is sized for a circular plain disk 220 that is 5" in diameter, the accent graphic 316 is 0.5" in size, but those of skill in the art will understand that this is only exemplary and that the size of the accent graphic 316 can vary without departing from the broader principles described herein. In some embodiments, the accent graphic 316 is the same size as the graphics comprising the patterned portion 312; for example, the patterned portion 312 includes a pattern of baseballs and the accent graphic 316 is a baseball that is the same size as the baseballs in the pattern of baseballs.

Figure 3B:
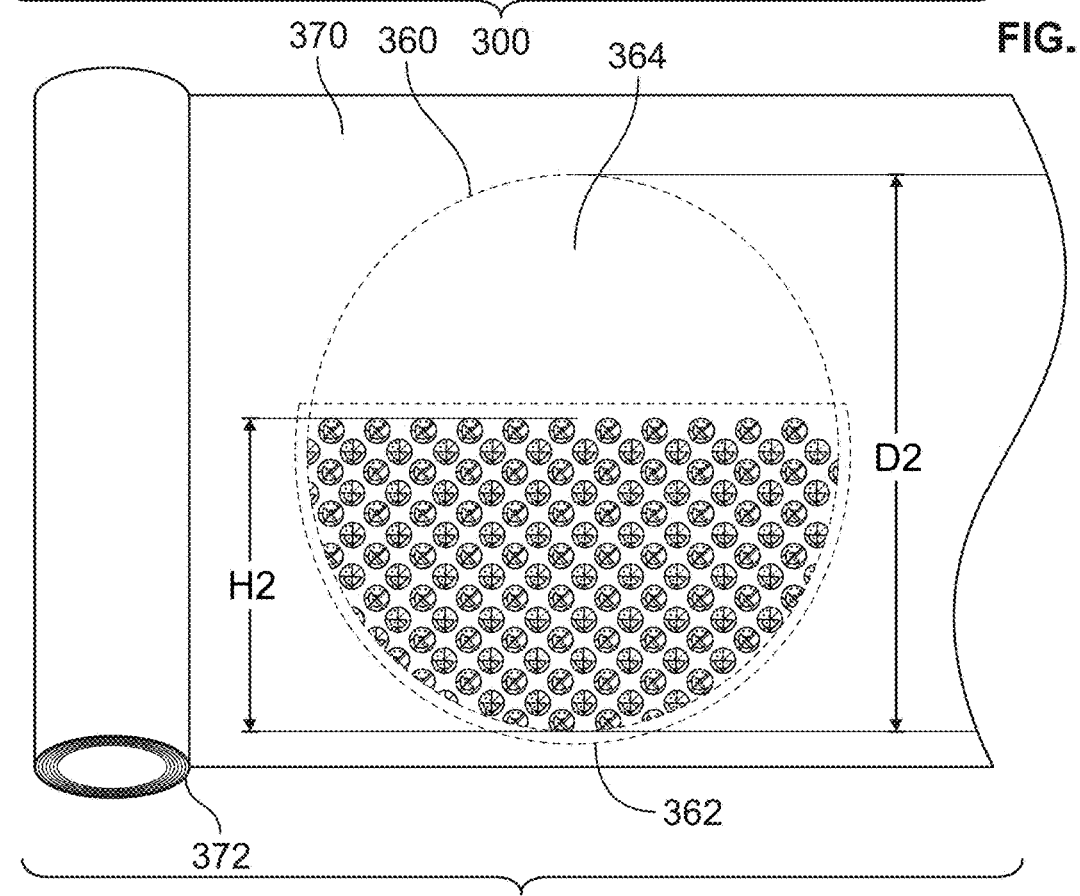
FIG. 3B shows a second exemplary graphic part that is suitable for use during the performance of the exemplary methods of FIGS. 1A, 1B, 15A, and 15B.

FIG. 3B shows a second exemplary graphic part 350. In some embodiments, the graphic part 350 is substantially similar to the graphic part 300 described above other than as described hereinafter. In some embodiments, the graphic part 350 includes a graphic 360 disposed on a carrier film 370. In some embodiments, the carrier film is provided in a roll 372. In some embodiments, the graphic 360 is circular and has a diameter D2. In some embodiments, the diameter D2 is 5". In some embodiments, the diameter D2 is 120 mm. In some embodiments, the graphic 360 includes a patterned portion 362 and a plain portion 364. In some embodiments, the patterned portion 362 has a height H2 and occupies a portion of the graphic 360 that is a major segment of a circle having a diameter D1 defined by a chord that is a distance H2 from the opposite side of the circle. In some embodiments, the distance H2 is 2.75". In some embodiments, the distance H2 is 72 mm.

In steps 130, 140, 150, and 160, the graphic part 300 or 350 is applied to the plain disk 210 or 220 to produce a decorated disk 400. In embodiments in which the graphic part 300 or 350 includes multiple instances of the graphic 310 or 360 on a same carrier film 320 or 370 (e.g., on a roll 322, as shown in FIG. 3A), the graphic part 300 or 350 may be partitioned before application (e.g., the portion of the carrier film 320 or 370 including one instance of the graphic 310 or 360 may be separated from the remainder of the roll 322 or 372, such as by cutting), or may be applied to the plain disk 210 or 220 without separation. In some embodiments, the graphic part 300 is applied to the plain disk 210 or 220 by heat stamping. In some embodiments, the application (e.g., heat stamping) process causes the graphic 310 or 360 to be transferred from the carrier film 320 to the plain disk 210 or 220 and be fused into the plain disk 210 or 220 in order to produce the decorated disk 400, 410, or 420. In some embodiments, as a result of the heat stamping process, the graphic 310 or 360 is caused to be positioned within, rather than atop, the surface of the plain disk 210 or 220.

In some embodiments, the graphic part 300 or 350 is applied to the plain disk 210 or 220 by a heat stamping process performed using a heat stamping press such as that commercialized by Hastings Advanced Decorating Systems, Inc. of Millstadt, Ill. under the trade name P2000. In some embodiments, the graphic part 300 or 350 is applied to the plain disk 210 or 220 by a heat stamping process performed using another suitable heat stamping press. In some embodiments, the heat stamping press is a 2-ton heat stamping press. In step 130, the heat stamping press is preconfigured for the heat stamping process. In some embodiments, the preconfiguring step includes providing appropriate dies to the upper and lower heads of the heat stamping press. In some embodiments, the dies include silicone. In some embodiments, the dies include another appropriate material that is capable of tolerating the temperatures and pressures described below. In some embodiments, the preconfiguring includes preheating. In some embodiments, the preconfiguring includes preheating both the upper and lower heads. In some embodiments, the upper head is preheated to a temperature that is between 350° F. and 600° F., or is between 400° F. and 600° F., or is between 425° F. and 575° F., or is between 450° F. and 550° F., or is between 475° F. and 525° F., or is between 490° F. and 510° F., or is about 500° F., or is 500° F., or is about 480° F., or is 480° F., or is about 400° F., or is 400° F. In some embodiments, the lower head is preheated to a temperature that is between 150° F. and 450° F., or is between 150° F. and 425° F., or is between 150° F. and 400° F., or is between 175° F. and 400° F., or is between 200° F. and 400° F., or is between 225° F. and 375° F., or is between 250° F. and 350° F., or is between 275° F. and 325° F., or is between 290° F. and 310° F., or is about 300° F., or is 300° F., or is about 200° F., or is 200° F., or is about 375° F., or is 375° F.

In some embodiments, at least one of the dies includes a texture. In some embodiments, the texture includes a three-dimensional (e.g., not planar) pattern such that, when the dies are applied to the graphic part 300 or 350 and the plain disk 210 or 220 to perform the heat stamping process, the at least one textured die including a pattern direct contact with the graphic part 300 or 350 or the plain disk 210 or 220 at some locations within the pattern and does not make direct contact at other locations of the pattern. In some embodiments, the locations that do not make direct contact form at least one channel extending to the edge of the at least one die that includes a pattern. In some embodiments, the at least one textured die has a square cross-hatched pattern having squares with a side length of 0.04". In some embodiments, the at least one textured die has a pattern having a depth of 0.005" to 0.010". In some embodiments, the pattern provides at least one channel allowing air to escape from between the graphic part 300 or 350 and the plain disk 210 or 220 during the heat stamping process, thereby preventing air bubbles from being formed between the graphic part and the plain disk 210 or 220, and thereby producing the decorated disk 400, 410, or 420 with a more consistent and aesthetically pleasing appearance.

Figure 8:
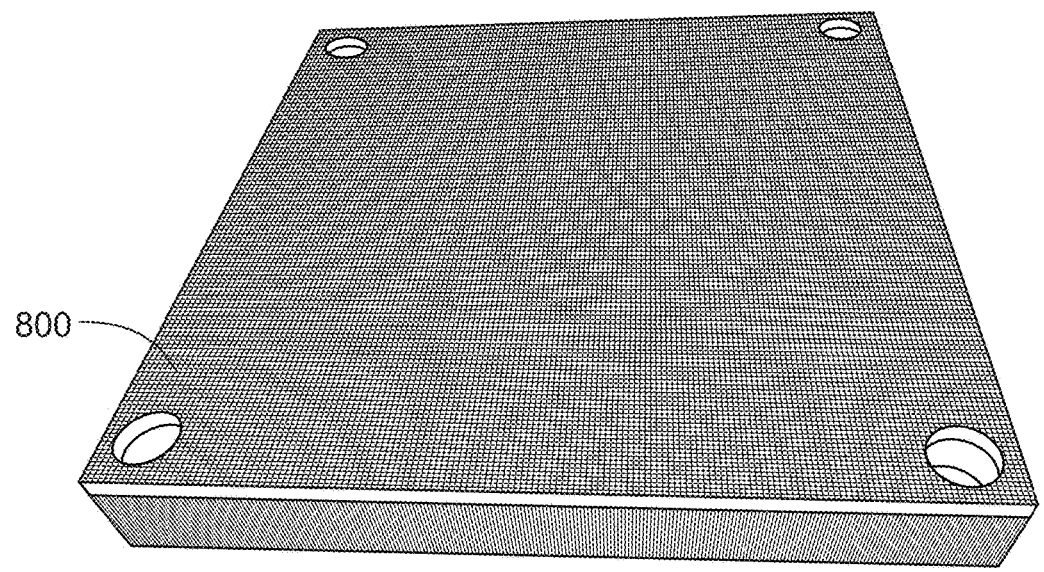
FIG. 8 shows an exemplary textured die.
Figure 9:
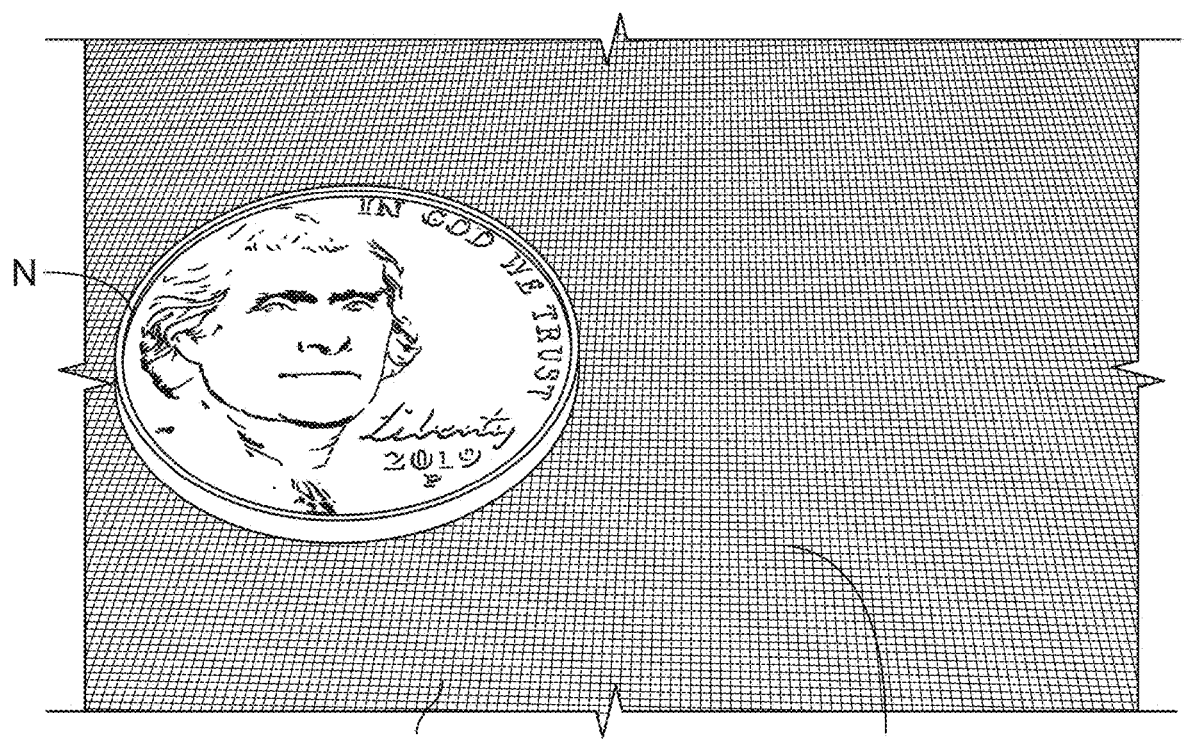
FIG. 9 shows a magnified view of the exemplary textured die of FIG. 8.
Figure 10:
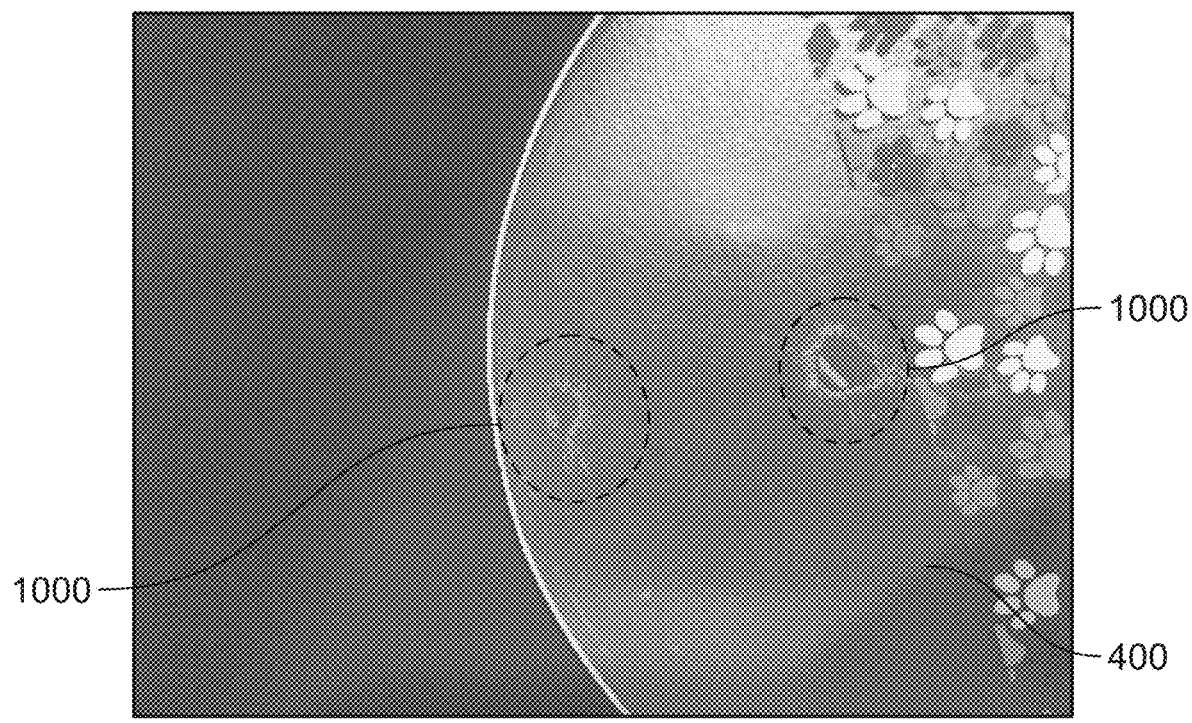
FIG. 10 shows an exemplary decorated disk made without the use of an exemplary textured die, which decorated disk includes air bubbles.
Figure 11:
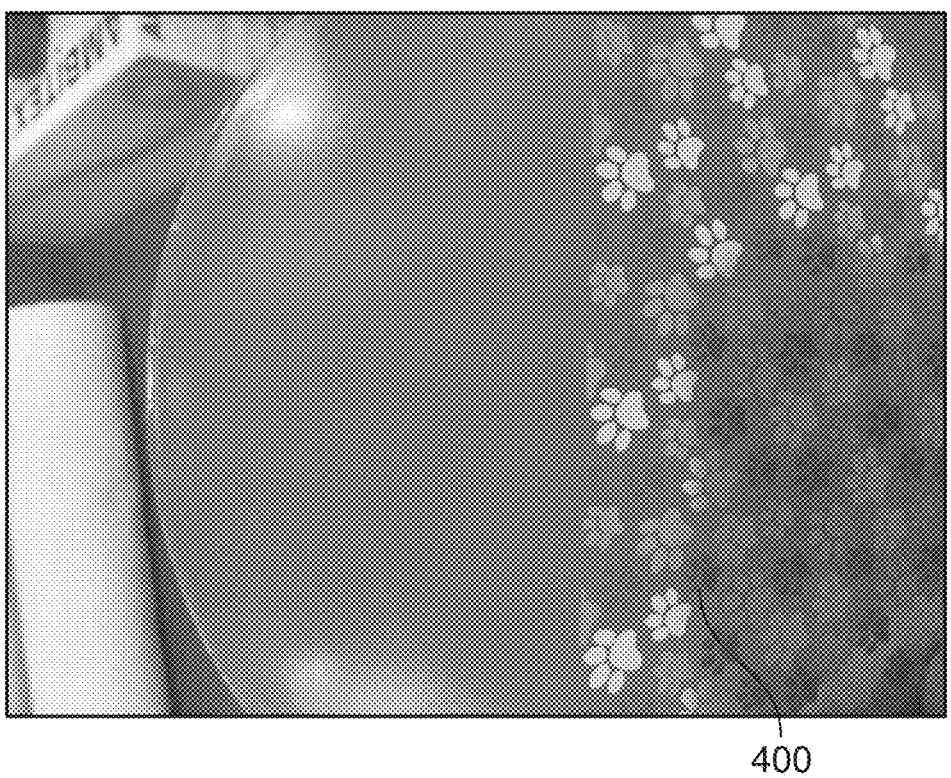
FIG. 11 shows an exemplary decorated disk made with the use of the exemplary textured die, which decorated disk lacks air bubbles.

In some embodiments, the pattern used on the at least one textured die is a crosshatched pattern, but those of skill in the art will understand that other types of patterns may also be used to provide the same channels allowing for air to disperse when pressure is applied during the heat stamping process. In some embodiments, the crosshatched pattern includes squares having a side length of 0.04" formed at a depth of 0.005"-0.010". FIG. 8 shows an exemplary textured die 800. FIG. 9 shows a magnified view of the exemplary textured die 800 and a United States nickel N for scale. As may be seen in FIG. 9, the die 800 includes channels 810 formed therein (as will be apparent to those of skill in the art, for clarity, only one of the channels 810 is specifically indicated in FIG. 9). FIG. 10 shows an embodiment of the exemplary decorated disk 400 that includes air bubbles 1000 introduced during the heat stamping process. As discussed above, in some embodiments, the textured die allows for trapped air to escape during the heat stamping process. FIG. 11 shows an embodiment of the exemplary decorated disk 400 that is fabricated identically to the process used to fabricate the embodiment of the exemplary decorated disk 400 shown in FIG. 10, but for the use of a textured die as described above. As may be seen, the exemplary decorated disk 400 shown in FIG. 11 does not include blemishes such as the blemishes 1000 shown in FIG. 10.

In step 140, the plain disk 210 or 220 is placed on the preconfigured lower head of the heat stamping press. In step 150, the graphic part 300 or 350 is placed on the preconfigured upper head of the heat stamping press. In step 160, the heat stamping press is operated so as to press the plain disk 210 or 220 and the graphic part 300 or 350 together so as fuse the graphic 310 or 360 to the plain disk 210 or 220. In some embodiments, operation of the heat stamping press in step 160 includes an air pressure to be applied and a dwell time during which the pressure is to be applied. In some embodiments, the air pressure is between 50 PSI and 70 PSI, or is between 52 PSI and 68 PSI, or is between 54 PSI and 66 PSI, or is between 56 PSI and 64 PSI, or is between 58 PSI and 62 PSI, or is about 60 PSI, or is 60 PSI, or is between 30 PSI and 50 PSI, or is between 32 PSI and 48 PSI, or is between 34 PSI and 46 PSI, or is between 36 PSI and 44 PSI, or is between 38 PSI and 42 PSI, or is about 40 PSI, or is 40 PSI. In some embodiments, the dwell time is between 0.1 seconds and 10 seconds, or is between 0.1 seconds and 9 seconds, or is between 0.1 seconds and 8 seconds, or is between 0.1 seconds and 7 seconds, or is between 0.1 seconds and 6 seconds, or is between 0.1 seconds and 5 seconds, or is between 0.1 seconds and 4 seconds, or is between 0.5 seconds and 3.5 seconds, or is between 1 second and 3 seconds, or is between 1.5 seconds and 2.5 seconds, or is between 1.8 seconds and 2.2 seconds, or is about 2.0 seconds, or is 2.0 seconds.

Following step 160, the graphic 310 or 360 has been fused to the plain disk 210 or 220 so as to form a decorated disk 400. In some embodiments, following step 160, the carrier film 320 is discarded. In step 170, the decorated disk 400 is removed from the heat stamping press. In step 180, the decorated disk 400 is placed between two cold plates to cool. In some embodiments, the cold plates are held at a temperature of between 65° F. and 75° F. In some embodiments, cooling in this manner prevents warping of the decorated disk. In some embodiments, the decorated disk 400 is kept between the cold plates for a duration of greater than 10 seconds, or of greater than 20 seconds, or of between 10 seconds and 50 seconds, or of between 15 seconds and 45 seconds, or of between 20 seconds and 40 seconds, or of between 25 seconds and 35 seconds, or of about 30 of seconds, or of 30 seconds. In some embodiments, the cooling press is a heat stamping press (e.g., a 2-ton heat-stamping press such as that commercialized by Hastings Advanced Decorating Systems, Inc. of Millstadt, Ill. under the trade name P2000) that is used with its heat source inactivated such that it is at or about room temperature (e.g., about 70° F. to 75° F.). In some embodiments, the cooling press includes flat aluminum cooling blocks at a cooling temperature that is at or about room temperature (e.g., about 70° F. to 75° F.). In some embodiments, the cooling press is operated at an air pressure of 40 to 50 psi. In some embodiments, the cooling press is operated at an air pressure of about 40 psi. In some embodiments, the cooling press is operated at an air pressure of 40 psi. In some embodiments, the cooling press applies a force of one ton.

Figure 4A:
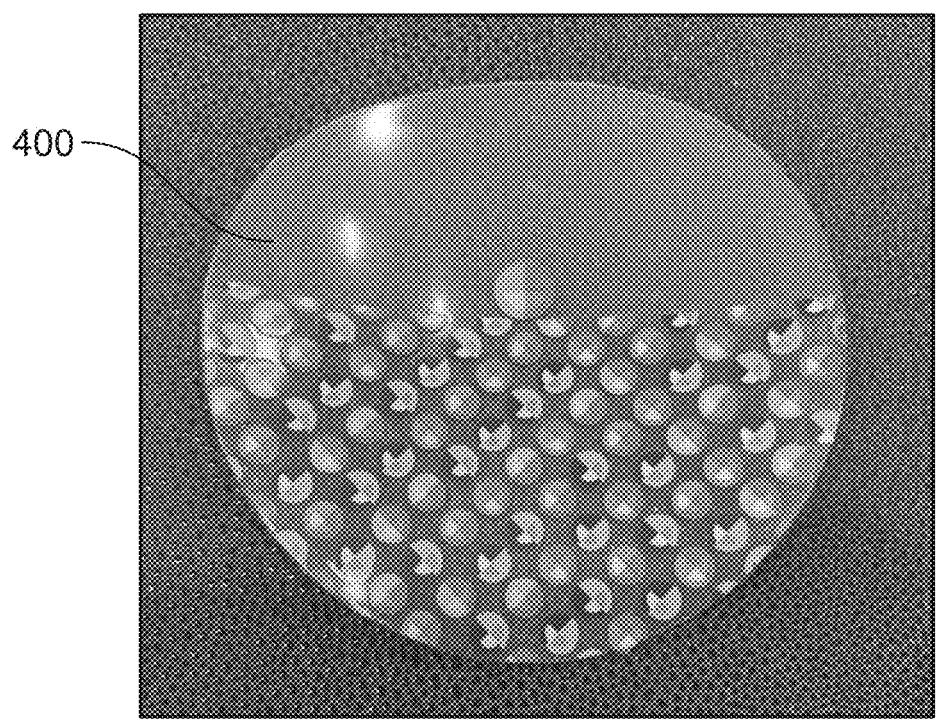
FIG. 4A shows a first exemplary decorated disk that is produced by one of the methods of FIGS. 1A, 1B, 15A, and 15B.
Figure 4B:
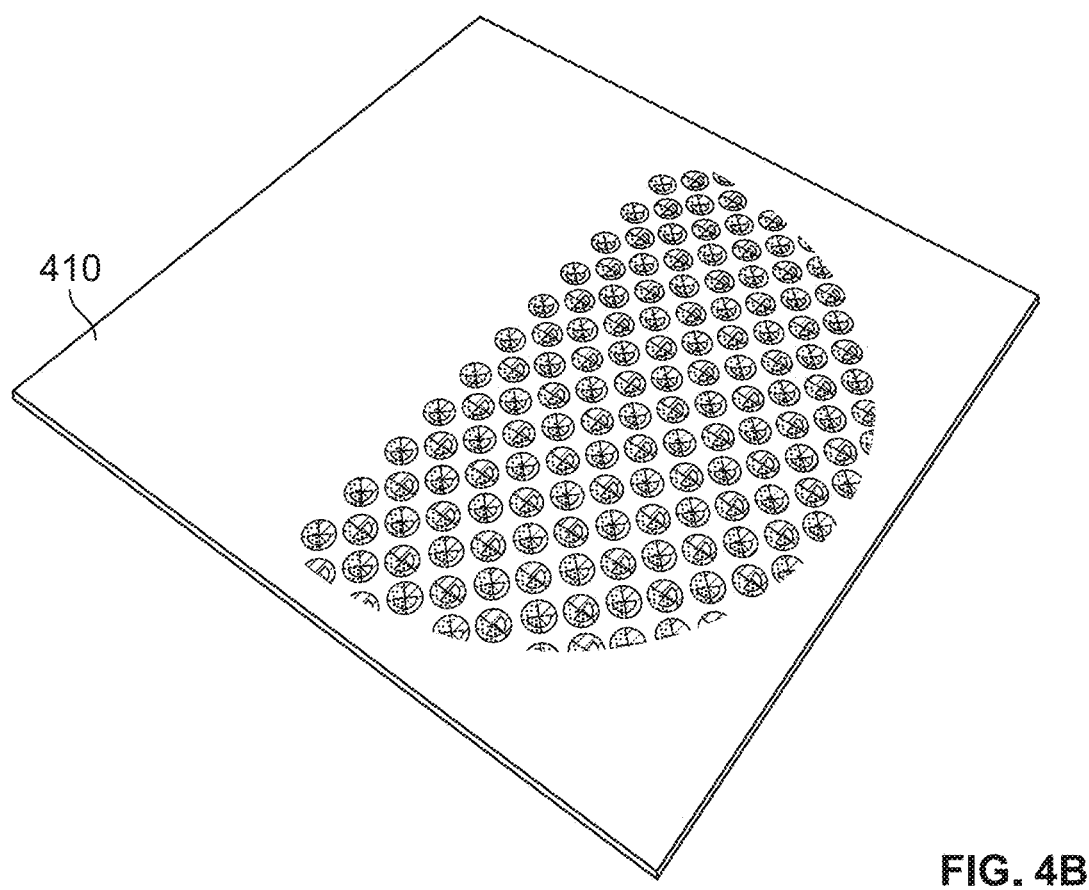
FIG. 4B shows a second exemplary decorated disk that is produced by one of the methods of FIGS. 1A, 1B, 15A, and 15B.
Figure 4C:
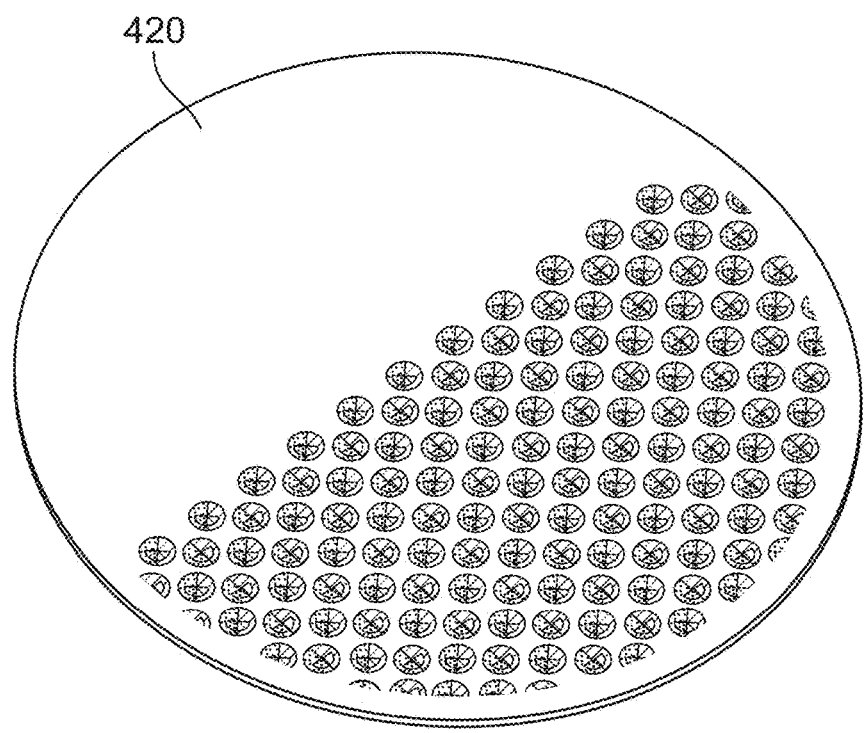
FIG. 4C shows a third exemplary decorated disk that is produced by one of the methods of FIGS. 1A, 1B, 15A, and 15B.

Following step 180, the method 100 is complete. FIG. 4A shows a first exemplary decorated disk 400 produced following step 180 by the application of the graphic part 300 shown in FIG. 3A to the circular plain disk 220 shown in FIG. 2B. FIG. 4B shows a second exemplary decorated disk 410 produced following step 180 by the application of the graphic part 350 shown in FIG. 3B to the square plain disk 210 shown in FIG. 2A. FIG. 4C shows a third exemplary decorated disk 420 produced following step 180 by the application of the graphic part 350 shown in FIG. 3B to the circular plain disk 220 shown in FIG. 2B. In some embodiments, the exemplary decorated disks 400 produced by the method 100 are suitable for use in the fabrication of various types of dental appliances, such as orthodontic retainers, mouth guards used for dental purposes, mouth guards worn during sleep for dental purposes, teeth aligners, teeth positioners, dental bleaching trays, and mouth splints for dental purposes. In some embodiments, the exemplary decorated disks are suitable for use in the fabrication of dental appliances that are custom-made for a given patient in accordance with known techniques. In some embodiments, the exemplary decorated disks are suitable for use in the fabrication of dental appliances by the same fabrication processes as are used to fabricate dental appliances using plain disks, such as the disks 210 and 220 shown in FIGS. 2A and 2B, respectively.

Figure 2A:
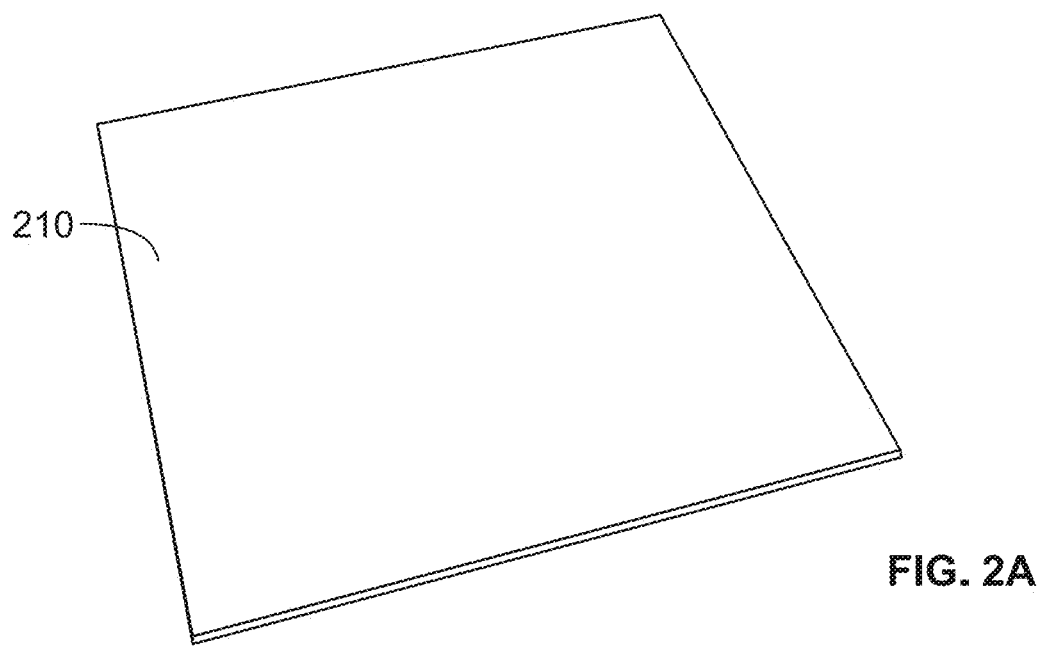
FIG. 2A shows a square plain disk that is suitable for use during the performance of the exemplary methods of FIGS. 1A, 1B, 15A, and 15B.
Figure 2B:
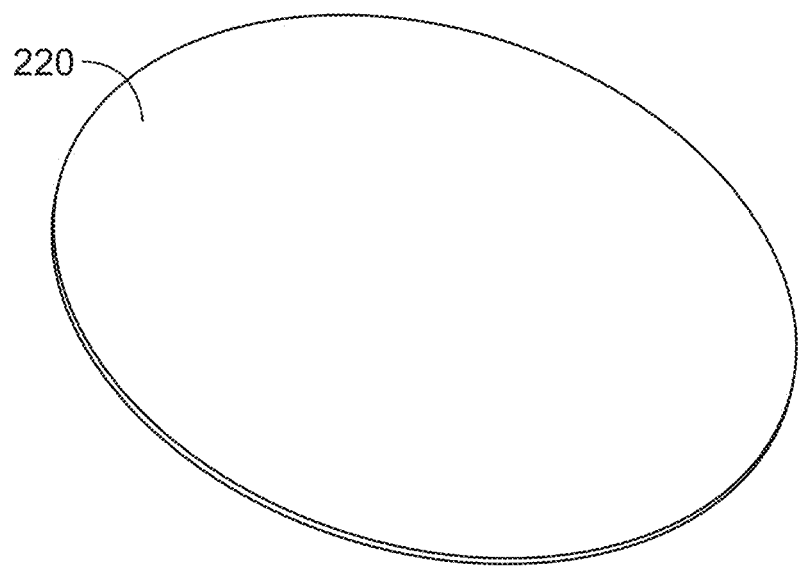
FIG. 2B shows a circular plain disk that is suitable for use during the performance of the exemplary methods of FIGS. 1A, 1B, 15A, and 15B.

In some embodiments, the method 100 shown in FIG. 1A can be referred to as a "one-hit" process, e.g., a process in which the heat stamping press is operated so as to press the plain disk 210 or 220 and the graphic part 300 or 350 together during one pressing instance. In other embodiments, heat stamping may be performed according to what can be referred to as a "two-hit" process, e.g., a process in which the heat stamping press is operated so as to press the plain disk 210 or 220 and the graphic part 300 or 350 together during two discrete pressing instances. In some embodiments, the plain disk 210 or 220 and the graphic part 300 or 350 are repositioned between the two pressing instances of a two-hit process.

Figure 1B:
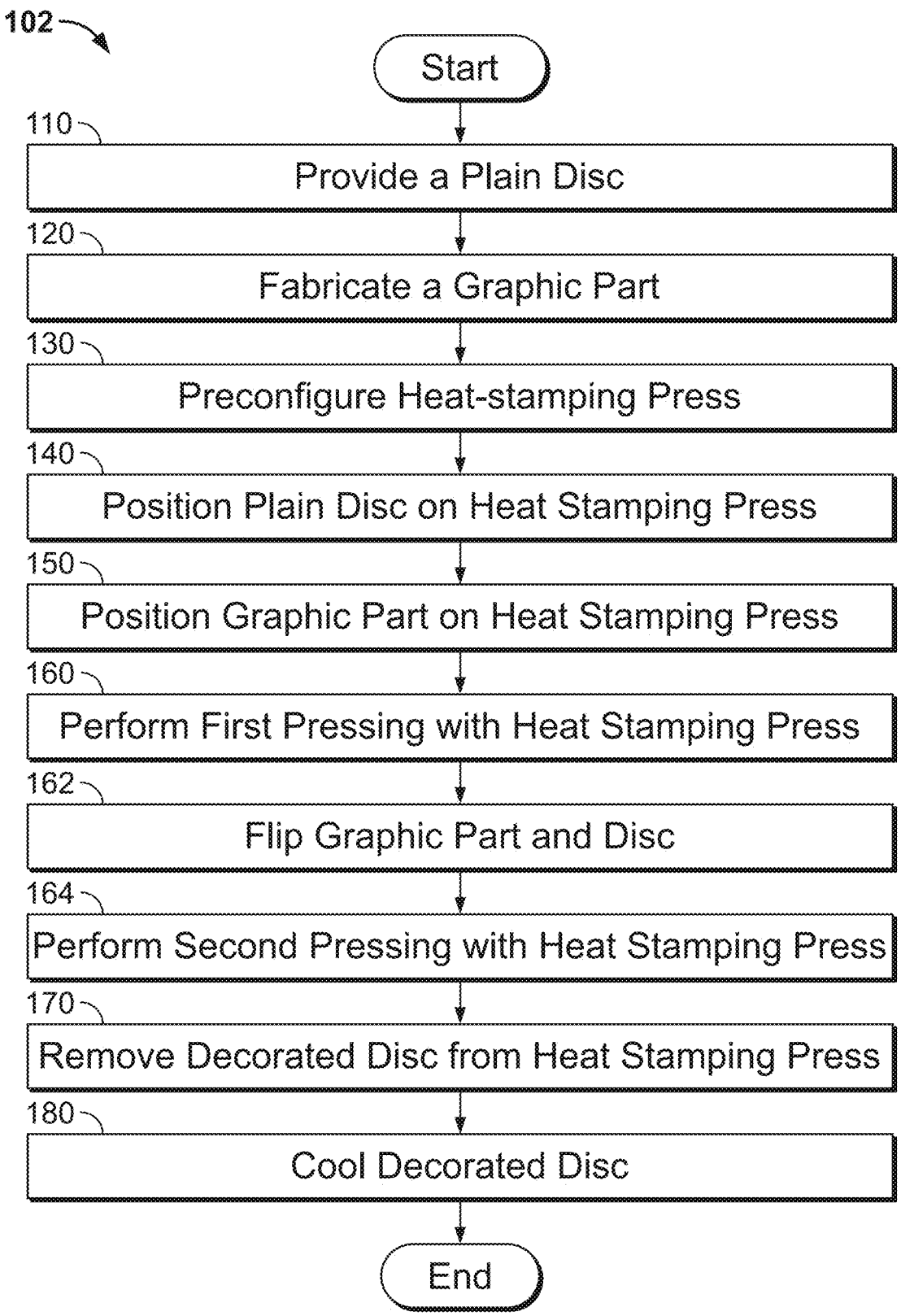
FIG. 1B shows a flowchart of a second exemplary method.

FIG. 1B shows a second exemplary method 102 that is a "two-hit" process. The method 102 is substantially similar to the method 100 shown in FIG. 1A other than as described hereinafter. The method 102 includes steps 110 through 160 that are the same as steps 110 through 160 of the method 100. Following step 160, in step 162, the graphic part 300 or 350 and the plain disk 210 or 220 are inverted on the heat stamping press (e.g., flipped in the manner of flipping a record album between sides). Following step 162, in step 164, the heat stamping press is operated for a second pressing. In some embodiments, the dwell time of the second pressing is of shorter duration than the first pressing of step 160. In some embodiments, the dwell time of the second pressing is between 0 between 0.1 seconds and 5 seconds, or is between 1 second and 5 seconds, or is between 0.1 seconds and 4 seconds, or is between 0.5 seconds and 3.5 seconds, or is between 0.5 second and 2.5 seconds, or is between 1.0 seconds and 2.0 seconds, or is between 1.8 seconds and 2.2 seconds, or is about 2.0 seconds, or is 2.0 seconds, or is about 1.5 seconds, or is 1.5 seconds. Following the second pressing of step 164, the method 102 continues to step 170. Steps 170 and 180 of the method 102 are substantially similar to steps 170 and 180 of the method 100. Following step 180, the method 102 is complete.

Figure 5A:
FIG. 5A shows a top view of a dental appliance that is made from a decorated disk having a pattern across the entirety thereof.
Figure 5B:
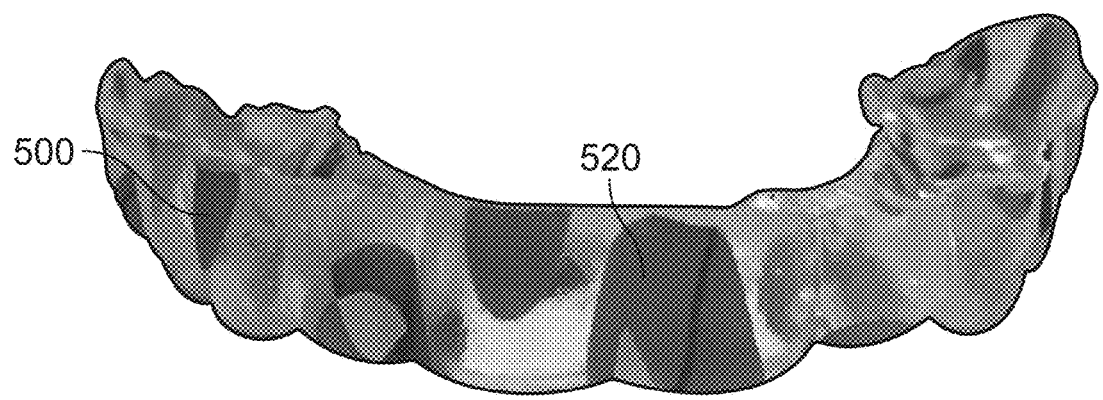
FIG. 5B shows a front view of the dental appliance of FIG. 5A.

As discussed above, in some embodiments, the pattern covers less than all of the graphic part 300 or 350, and, as a result, less than all of the decorated disk 400, 410, or 420 is covered by the pattern after application of the graphic part 300 or 350 to the plain disk. In some embodiments, the exemplary decorated disks 400, 410, or 420 are provided together with direction for use such that the portion of the decorated disk 400 lacking the pattern is used to form the front portion of a dental appliance (e.g., the portion that overlays a patient's front teeth). In an embodiment, when a plastic disk (whether a plain disk such as the plain disk 210 or 220 or a decorated disk such as the decorated disk 400, 410, or 420) is used to form a dental appliance, the portion of the plastic disk that is shaped to form the front portion of the dental appliance typically experiences the most significant distortion during the thermoforming process for fabricating dental appliances. Consequently, should a graphic (e.g., the graphic 310 or 360) be present across an entire plastic disk, the portion of the graphic that covers the front teeth would be similarly distorted. FIGS. 5A and 5B shows a dental appliance 500 made from a decorated plastic disk having a graphic across its entirety. As may be seen, the dental appliance 500 includes a rear portion 510 having a graphic that appears undistorted and a front portion 520 in which the same graphic appears distorted. Therefore, an arrangement in which the front portion is clear (i.e., lacking a pattern) may be preferable in order that the pattern (present only toward the rear of the mouth) is not significantly distorted. Such an arrangement provides the surprising result that a dental appliance produced from a decorated disk having decorations only over a portion (for example, between 50% and 60%) thereof is more aesthetically desirable than a dental appliance produced from a decorated disk having decorations over the entirety thereof.

Figure 6:
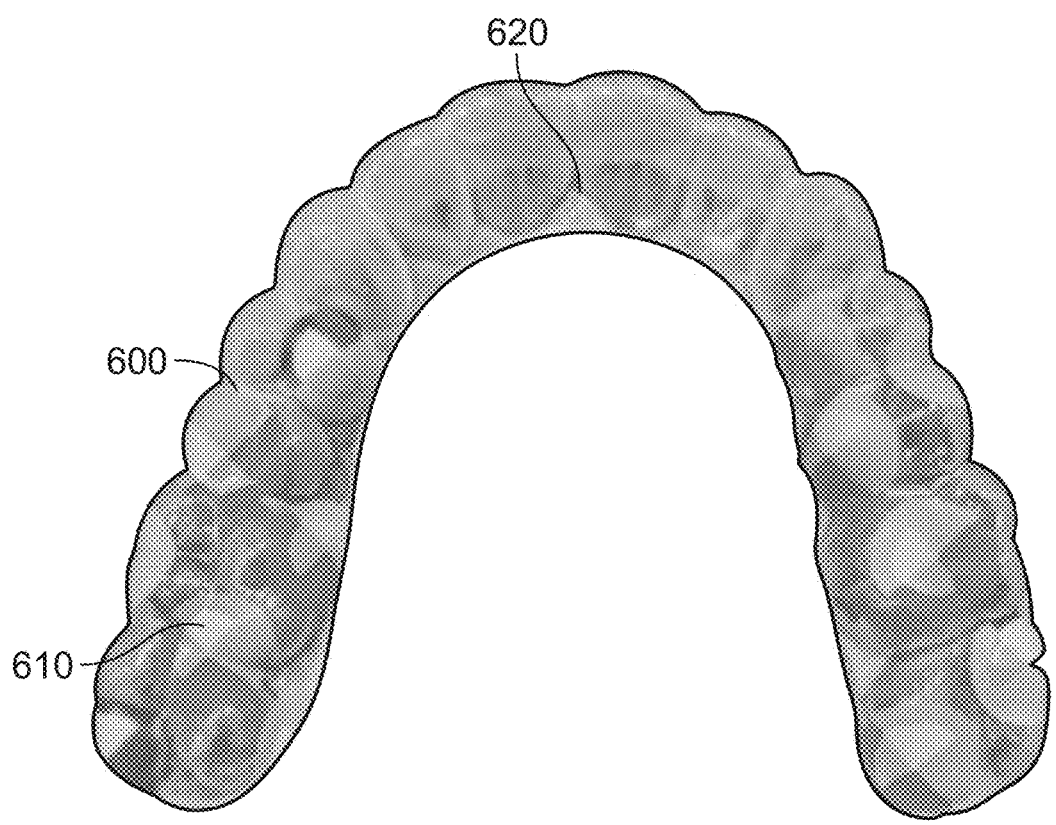
FIG. 6 shows an exemplary dental appliance that is made from an exemplary decorated disk similar to that shown in FIG. 4B.

FIG. 6 illustrates an exemplary dental appliance 600 made from an exemplary decorated disk such as the exemplary decorated disk 400, 410, or 420 made by the exemplary method 100. The exemplary dental appliance 600 includes a decorated rear portion 610 corresponding to the patterned portion 312 of the graphic 310 and a plain front portion 620 corresponding to the plain portion 314 of the graphic 310. As can be seen, the graphics included in the decorated rear portion 610 of the dental appliance 600 are not distorted.

As discussed above, in some embodiments, the graphic 310 includes an accent graphic 316 that is located in the plain portion 314 and adjacent to the patterned portion 312.

Figure 7A:
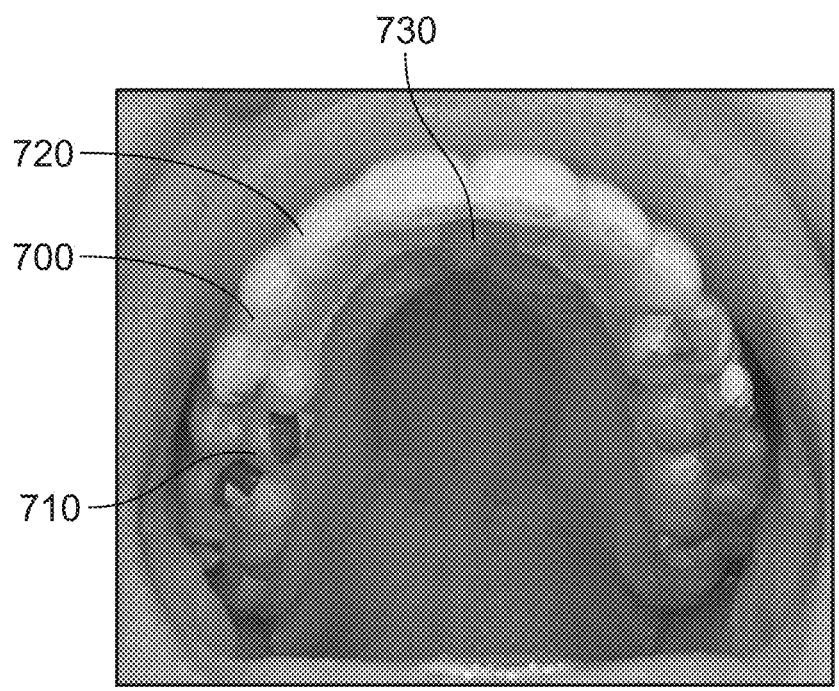
FIG. 7A shows an exemplary dental appliance that is made from an exemplary decorated disk as shown in FIG. 4A.

FIG. 7A illustrates an exemplary dental appliance 700 made from an exemplary decorated disk that is, in turn, made from a graphic part 300 having a graphic 310 that includes such an accent graphic 316. More particularly, the dental appliance 700 is shown in FIG. 7A as positioned in the mouth of a wearer. The exemplary dental appliance 700 includes a decorated rear portion 710 corresponding to the patterned portion 312 of the graphic 310, a plain front portion 720 corresponding to the plain portion 314 of the graphic 310, and an accent graphic 730 corresponding to the accent graphic 316 of the graphic 310. As can be seen, the accent graphic 730 is located at a portion of the dental appliance 700 that is positioned behind the front teeth of the wearer when the dental appliance 700 is worn, and is not distorted.

Figure 7B:
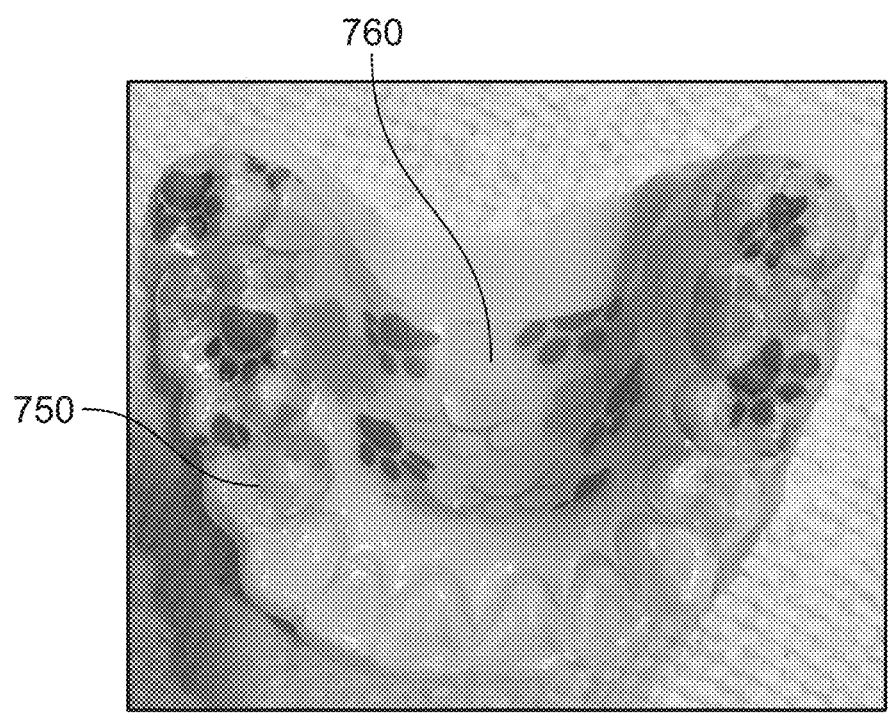
FIG. 7B shows an exemplary dental appliance that is made from an exemplary decorated disk similar to those shown in FIGS. 4B and 4C.

In some embodiments, an exemplary dental appliance may be made from the exemplary decorated disk 400, 410, or 420 in a manner such that the exemplary dental appliance includes a portion that spans across the palate when the exemplary dental appliance is positioned in the mouth of a wearer. FIG. 7B shows an exemplary dental appliance 750 including a decorated central portion 760 that is positioned so as to span across the palate when the exemplary dental appliance 750 is positioned in the mouth of a wearer.

Figure 12:
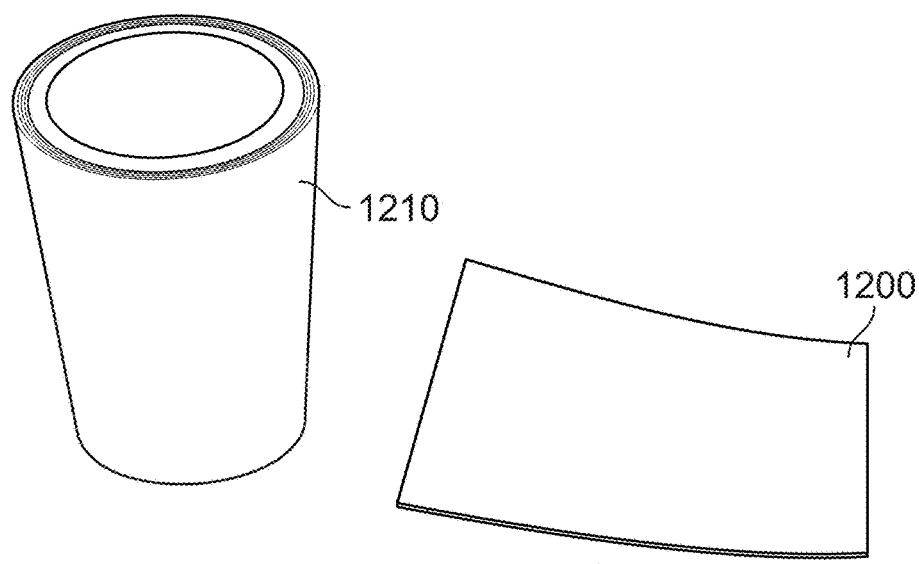
FIG. 12 shows an exemplary plain carrier film.

In some embodiments, the exemplary decorated disk 400, 410, or 420 is made by a process that also includes the use of a plain carrier film 1200 (i.e., a carrier that does not include a graphic thereon). In some embodiments of such a process, during heat stamping, the plain disk 210 or 220 is positioned between (e.g., sandwiched between) the graphic part 300 or 350 and the plain carrier film 1200. In some embodiments, the plain carrier film 1200 includes PET. FIG. 12 shows the exemplary carrier film 1200 as sized and shaped for use in the fabrication of the exemplary decorated disk 400, 410, or 420. In some embodiments, the plain carrier film 1200 is provided in a roll. FIG. 12 also shows an exemplary roll 1210 of the plain carrier film 1200.

Figure 13:
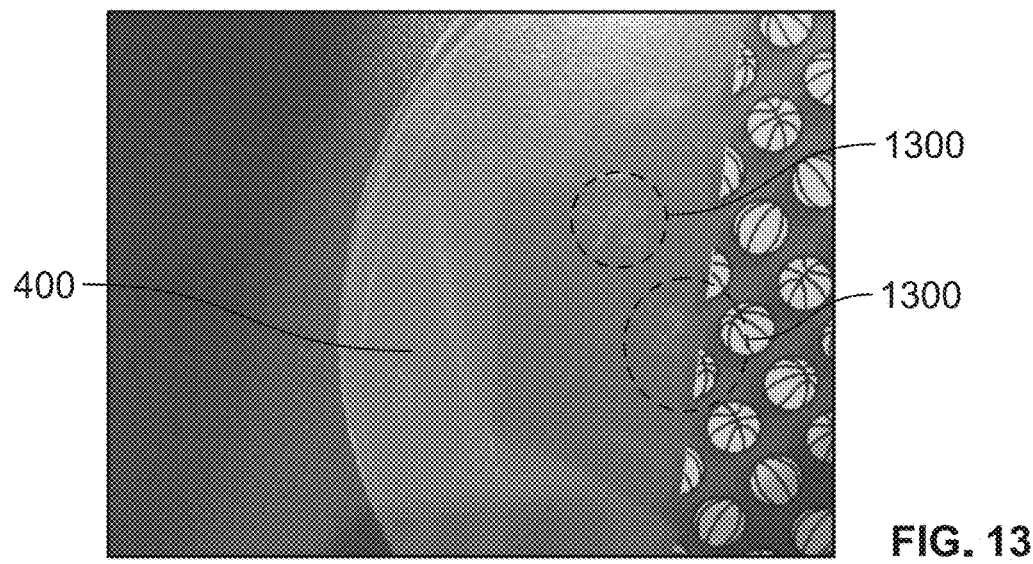
FIG. 13 shows an exemplary decorated disk made without the use of a plain carrier film, which decorated disk includes blemishes.
Figure 14:
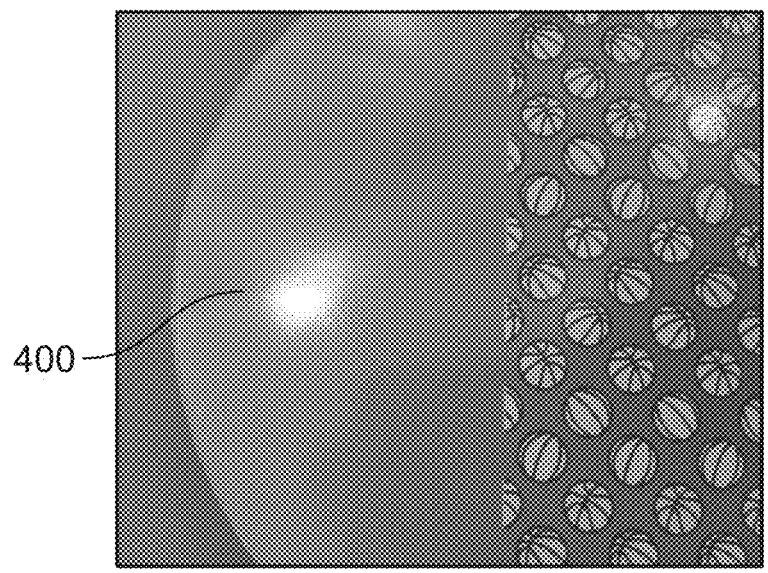
FIG. 14 shows an exemplary decorated disk made with the use of the exemplary plain carrier film, which decorated disk lacks blemishes.

In some embodiments, during a process for producing the decorated disk 400, 410, or 420 that does not involve use of the plain carrier film 1200, the plain disk 210 or 220 may stick to the die that is pressed against the plain disk 210 or 220. In some embodiments, when the plain disk 210 or 220 sticks to the die, blemishes may be introduced into the decorated disk 400, 410, or 420. FIG. 13 shows an embodiment of the exemplary decorated disk 400 that includes blemishes 1300 due to sticking between the plain disk 210 or 220 and the die during the fabrication process. In some embodiments, the plain carrier film 1200, when used as above during a process for producing a decorated disk 400, 410, or 420, prevents the plain disk 210 or 220 from sticking to the die that is pressed to the plain disk 210 or 220 during the heat stamping process. FIG. 14 shows an embodiment of the exemplary decorated disk 400 that is fabricated identically to the process used to fabricate the embodiment of the exemplary decorated disk 400 shown in FIG. 13, but for inclusion of the plain carrier film 1200 as described above. As may be seen, the exemplary decorated disk 400 shown in FIG. 14 does not include blemishes such as the blemishes 1300 shown in FIG. 13.

In some embodiments, the plain carrier film 1200 is 3 millimeters in thickness. In some embodiments, the plain carrier film 1200 is between 1 millimeter and 10 millimeters in thickness. In some embodiments, the plain carrier film 1200 is between 1 millimeter and 9 millimeters in thickness. In some embodiments, the plain carrier film 1200 is between 1 millimeter and 8 millimeters in thickness. In some embodiments, the plain carrier film 1200 is between 1 millimeter and 7 millimeters in thickness. In some embodiments, the plain carrier film 1200 is between 1 millimeter and 6 millimeters in thickness. In some embodiments, the plain carrier film 1200 is between 1 millimeter and 5 millimeters in thickness. In some embodiments, the plain carrier film 1200 is between 1 millimeter and 4 millimeters in thickness. In some embodiments, the plain carrier film 1200 is between 2 millimeters and 4 millimeters in thickness. In some embodiments, the plain carrier film 1200 is between 2.5 millimeters and 3.5 millimeters in thickness. In some embodiments, the plain carrier film 1200 is glossy. In some embodiments, the plain carrier film 1200 is matte.

Figure 15A:
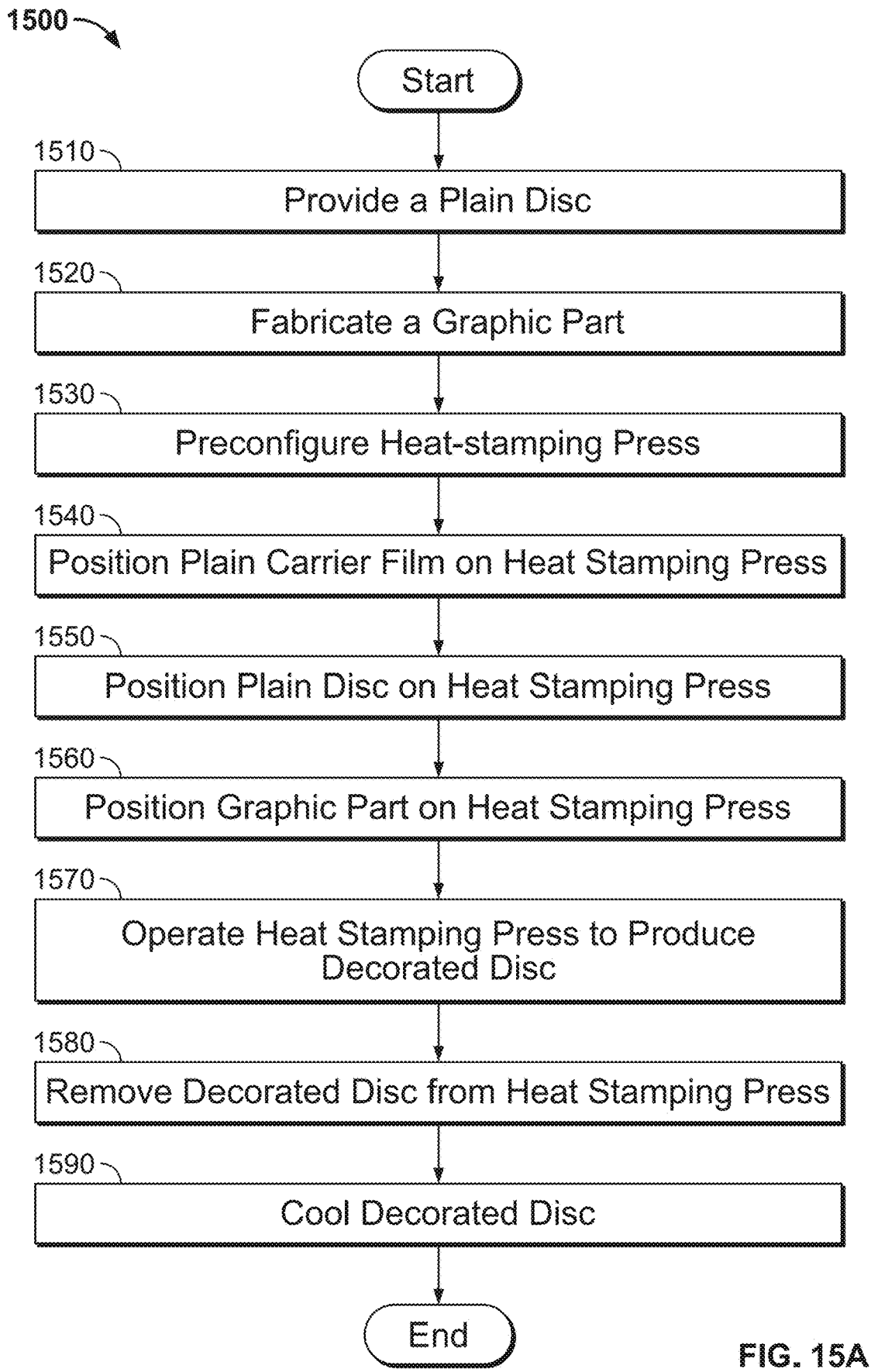
FIG. 15A shows a flowchart of a third second exemplary method.

FIG. 15A shows a flowchart of a third exemplary method 1500 for making a decorated plastic disk that is suitable for use in the fabrication of dental appliances. The second exemplary method 1500 is identical to the first exemplary method 100 (e.g., with regard to steps performed, exemplary process parameters, etc.) other than with regard to any differences specifically described hereinafter. In step 1510, a plain disk is provided. Step 1510 is substantially similar to step 110 of the method 100 described above. In step 1520, a graphic part is fabricated. Step 1520 is substantially similar to step 120 of the method 100 described above. In step 1530, a heat-stamping press is preconfigured. Step 1030 is substantially similar to step 130 of method the 100 described above.

In step 1540, a plain carrier film is positioned on the lower platen of the heat stamping press. In some embodiments, the plain carrier film includes a PET sheet that lacks a graphic. In some embodiments, the plain carrier film has a thickness of 0.3 millimeters. In step 1550, the plain disk is positioned on the heat stamping press atop the plain carrier film. Step 1550 is substantially similar to step 140 of the method 100 described above. In step 1560, the graphic part is positioned on the heat stamping press atop the plain disk. Step 1560 is substantially similar to step 150 of the method 100 described above.

In step 1570, the heat stamping press is operated to fuse the graphic of the graphic part with the plain disk, thereby producing a decorated disk. Step 1570 is substantially similar to step 160 of the method 100 described above. In step 1580, the decorated disk is removed from the heat stamping press. Step 1580 is substantially similar to step 170 of the method 100 described above. In step 1590, the decorated disk is placed in a cooling press for cooling. Step 1590 is substantially similar to step 180 of the method 100 described above. Following step 1590, the method 1500 is complete.

Figure 15B:
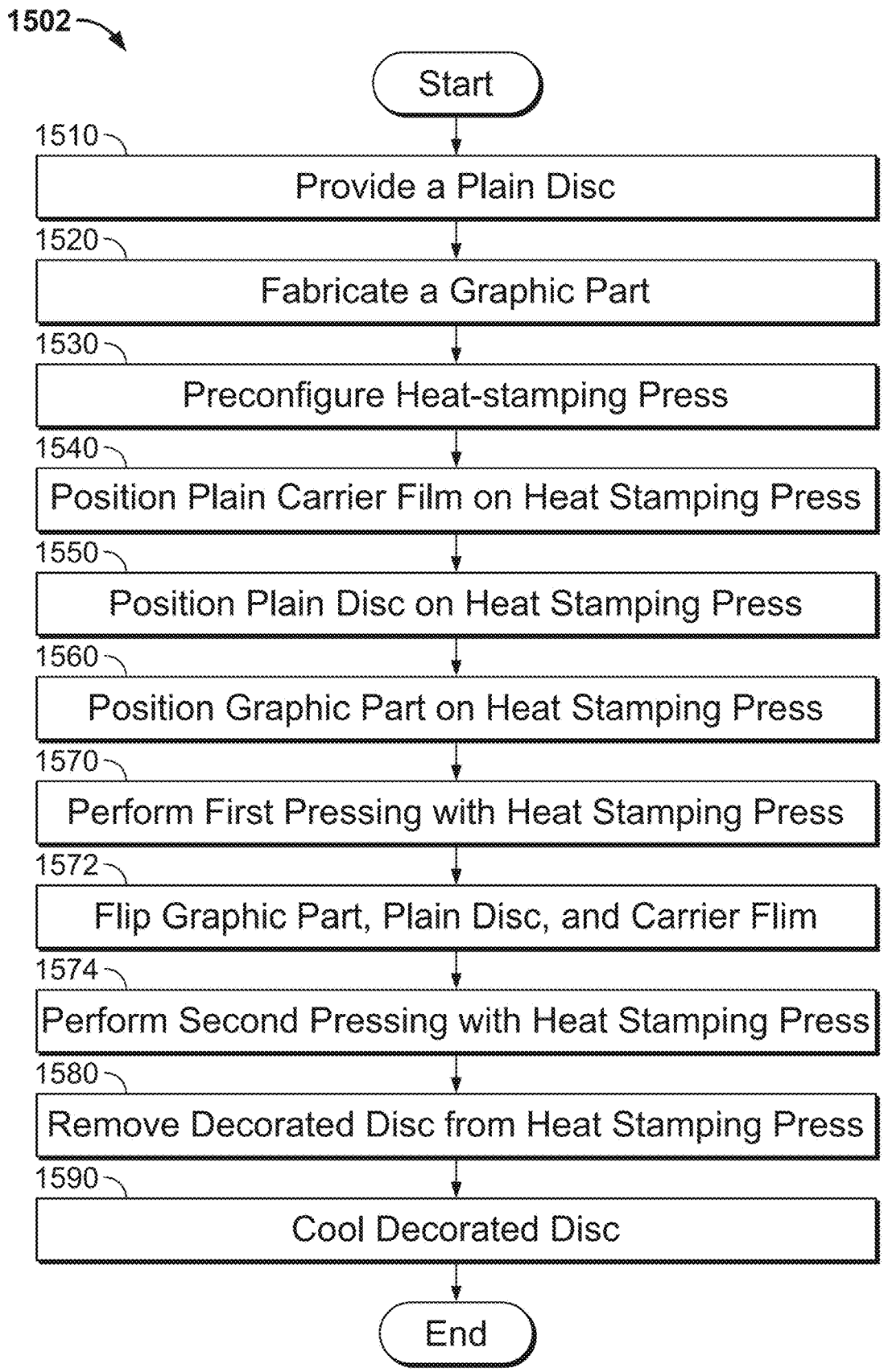
FIG. 15B shows a flowchart of a fourth exemplary method.

FIG. 15B shows a fourth exemplary method 1502 that is a "two-hit" process. The method 1502 is substantially similar to the "one-hit" method 1500 shown in FIG. 15A other than as described hereinafter. The method 1502 includes steps 1510 through 1570 that are the same as steps 1510 through 1570 of the method 1500. Following step 1570, in step 1572, the graphic part, the plain disk, and the plain carrier film are inverted on the heat stamping press (e.g., flipped in the manner of flipping a record album between sides). Following step 1572, in step 1574, the heat stamping press is operated for a second pressing. In some embodiments, the dwell time of the second pressing is of shorter duration than the first pressing of step 1570. In some embodiments, the dwell time of the second pressing is between 0 between 0.1 seconds and 5 seconds, or is between 0.1 seconds and 4 seconds, or is between 0.5 seconds and 3.5 seconds, or is between 0.5 second and 2.5 seconds, or is between 1.0 seconds and 2.0 seconds, or is between 1.8 seconds and 2.2 seconds, or is about 2.0 seconds, or is 2.0 seconds, or is about 1.5 seconds, or is 1.5 seconds. Following the second pressing of step 1574, the method 1502 continues to step 1580. Steps 1580 and 1590 of the method 1502 are substantially similar to steps 1580 and 1590 of the method 1500. Following step 1590, the method 1502 is complete.

In some embodiments, a graphic part includes a carrier film and a graphic portion, the graphic portion comprising a resin deposited on a portion of the carrier film to form a graphic, the carrier film and graphic portion being configured such that the application of the graphic part to a plastic disk by a heat-stamping process causes the resin to be transferred from the carrier film to the plastic disk and fuse with the material of the plastic disk so as to produce the graphic on the plastic disk, wherein the graphic portion is sized and shaped that, when the plastic disk is sized to be processed to form a dental appliance and the resin is transferred to the plastic disk and fuses with the material of the plastic disk to produce the graphic on the plastic disk, the graphic covers a portion of the plastic disk, the portion being less than all.

In some embodiments, the graphic includes a pattern. In some embodiments, the resin is FDA-compliant. In some embodiments, the resin includes an olefin. In some embodiments, the portion is between 50% and 60%. In some embodiments, the graphic part is square. In some embodiments, the graphic part is circular. In some embodiments, the graphic includes a patterned portion and an accent graphic adjacent to the patterned portion.

In some embodiments, a decorated disk includes a plastic disk and a resin deposited on a portion of the plastic disk, the decorated disk including a decorated portion defined by the portion of the plastic disk having the resin deposited thereon and a plain portion defined by a portion of the plastic disk not having the resin deposited thereon, the decorated portion being less than all of the plastic disk.

In some embodiments, the plastic disk comprises an FDA-compliant plastic. In some embodiments, the resin comprises an FDA-compliant resin. In some embodiments, the resin comprises an olefin. In some embodiments, the resin comprises an olefin that is colored with one or more pigments. In some embodiments, the resin forms a graphic. In some embodiments, the graphic includes a pattern. In some embodiments, the graphic includes a pattern and an accent graphic adjacent to the pattern. In some embodiments, the plastic disk is square. In some embodiments, the plastic disk is square and has a side length of five inches. In some embodiments, the plastic disk is square and the decorated portion is rectangular. In some embodiments, the rectangular decorated portion has a long side that is the same length as the square sides of the plastic disk, and is positioned such that three sides of the rectangular decorated portion are coincident with sides of the square plastic disk. In some embodiments, the plastic disk is circular. In some embodiments, the plastic disk is circular and has a diameter of between 100 millimeters and five inches. In some embodiments, the plastic disk is circular and the decorated portion is a major segment of the circular plastic disk. In some embodiments, a line segment extending from a perimeter of a circle defined by a perimeter of the circular plastic disk, through a center of the circle, and perpendicular to a chord defining the major segment has a length that is between 50% and 60% of a diameter of the circle. In some embodiments, the plastic disk is sized and shaped for fabrication of a dental appliance therefrom. In some embodiments, the plastic disk has a thickness of between 0.02 inches and 0.12 inches.

In some embodiments, a method includes receiving a plain disk configured for fabrication of a dental appliance therefrom, the method also including receiving a graphic part including a carrier film and a graphic portion, the graphic portion comprising a resin deposited on a portion of the carrier film to form a graphic, the carrier film and graphic portion being configured such that the application of the graphic part to the plain disk by a heat-stamping process causes the resin to be transferred from the carrier film to the plastic disk and fuse with the material of the plastic disk so as to produce a decorated disk, wherein the graphic portion is sized and shaped that, when plastic disk is sized to be processed to form a dental appliance and the resin is transferred to the plastic disk and fuses with the material of the plastic disk to produce the graphic on the plastic disk and, the graphic covers a portion of the plastic disk, the portion being less than all, the method also including applying the graphic part to the plain disk so as to produce the decorated disk.

In some embodiments, the step of applying the graphic part to the plain disk includes applying the graphic part to the plain disk by heat stamping. In some embodiments, the graphic portion includes a pattern. In some embodiments, the resin is FDA-compliant. In some embodiments, the resin includes an olefin. In some embodiments, an area of the portion is between 50% and 60% of the area of the plain disk. In some embodiments, the plain disk is square. In some embodiments, the plain disk is circular. In some embodiments, the plain disk includes a patterned portion and an accent graphic adjacent to the patterned portion. In some embodiments, the graphic part includes a plurality of the graphic portion.

EXAMPLES

Example 1

Example 1 presents an example of a two-hit process for fabricating a decorated disk from a plain disk that is 0.04 inches in thickness. The plain disk used in example 1 is made from the ESSIX material and is 0.04 inches in thickness. The graphic part includes a graphic that is made from an olefin-based resin and is disposed on a glossy PET carrier that is 3 millimeters in thickness. The plain carrier sheet is a glossy PET carrier that is 3 millimeters in thickness. The press to be used is a 2-ton heat-stamping press such as that commercialized by Hastings Advanced Decorating Systems, Inc. of Millstadt, Ill. under the trade name P2000. The heat stamping press is configured to operate at an air pressure of 60 psi with the lower platen at 200° F. and the upper platen at 480° F. A crosshatch-textured silicone die such as that shown in FIGS. 8-9 is applied to each of the upper and lower platens. The plain carrier sheet is positioned on the lower platen, the plain disk is positioned on the plain carrier sheet, and the graphic part is positioned on the plain disk. The heat stamping press is applied for a first pressing at an applied force of two tons and a cycle dwell time of 8.0 seconds to fuse the graphic to the plain disk. After the first pressing, the part (i.e., the graphic part, the plain disk, and the plain carrier sheet) is removed from the press, flipped over by 180 degrees (e.g., in a similar manner to flipping between sides of a record album), and placed back on the press. The heat stamping press is then applied for a second pressing at an applied force of two tons and a cycle dwell time of 2.0 seconds to continue fusing the graphic to the plain disk. Following the second pressing, the part is removed from the heat stamping press and placed into a cooling press. The cooling press is a heat stamping press that is used with its heat source inactivated such that it is at or about room temperature (e.g., about 70° F. to 75° F.). The cooling press includes flat aluminum cooling blocks at a cooling temperature that is at or about room temperature (e.g., about 70° F. to 75° F.). The cooling press operates at an air pressure of 40 psi. The cooling press is operated at an applied force of two tons for a dwell time of 10.0 seconds. Following operation of the cooling press, the process of Example 1 is complete. The plain carrier and the carrier that previously contained the graphic are removed from the decorated disk, which is a finished part at this point. The process parameters of Example 1 are summarized in Table 1 below:

TABLE 1

| | |
|---|---|
| Plain Disk Material | ESSIX Material |
| Plain Disk Thickness | 0.04" |
| Graphic Part Carrier | 0.3 mm glossy PET |
| Graphic Part Graphic | POLYFUZE Material |
| Plain Carrier Material | 0.3 mm glossy PET |
| Heat Press Air Pressure | 60 psi |
| Lower Platen Temperature | 200° F. |
| Lower Die | Crosshatched silicone |
| Upper Platen Temperature | 480° F. |
| Upper Die | Crosshatched Silicone |
| First Pressing Force | 2 Tons |
| First Pressing Dwell Time | 8.0 seconds |
| Second Pressing Force | 2 tons |
| Second Pressing Dwell Time | 2.0 seconds |
| Cooling Press Air Pressure | 40 psi |
| Cooling Press Temperature | Room temperature |
| Cooling Press Force | 1 Ton |
| Cooling Press Dwell Time | 10.0 seconds |

Example 2

Example 2 presents an example of a one-hit process for fabricating a decorated disk from a plain disk that is 0.04 inches in thickness. The process of Example 2 is the same as the process of Example 1 other than the omission of the steps of flipping the part after the first pressing and application of a second pressing using the heating press and the use of different process parameters. The process parameters of Example 2 are summarized in Table 2 below:

TABLE 2

| | |
|---|---|
| Plain Disk Material | ESSIX Material |
| Plain Disk Thickness | 0.04" |
| Graphic Part Carrier | 0.3 mm glossy PET |
| Graphic Part Graphic | POLYFUZE Material |
| Plain Carrier Material | 0.3 mm glossy PET |
| Heat Press Air Pressure | 60 psi |
| Lower Platen Temperature | 375° F. |
| Lower Die | Crosshatched silicone |
| Upper Platen Temperature | 400° F. |
| Upper Die | Crosshatched Silicone |
| First Pressing Force | 2 Tons |
| First Pressing Dwell Time | 8.0 seconds |
| Second Pressing Force | None |
| Second Pressing Dwell Time | None |
| Cooling Press Air Pressure | 40 psi |
| Cooling Press Temperature | Room temperature |
| Cooling Press Force | 1 Ton |
| Cooling Press Dwell Time | 10.0 seconds |

Example 3

Example 3 presents an example of a two-hit process for fabricating a decorated disk from a plain disk that is 0.03 inches in thickness. The process of Example 3 is the same as the process of Example 1 other than use of differing process parameters. The process parameters of Example 3 are summarized in Table 3 below:

TABLE 3

| | |
|---|---|
| Plain Disk Material | ESSIX Material |
| Plain Disk Thickness | 0.03" |
| Graphic Part Carrier | 0.3 mm glossy PET |
| Graphic Part Graphic | POLYFUZE Material |
| Plain Carrier Material | 0.3 mm glossy PET |
| Heat Press Air Pressure | 60 psi |
| Lower Platen Temperature | 200° F. |
| Lower Die | Crosshatched silicone |
| Upper Platen Temperature | 480° F. |
| Upper Die | Crosshatched silicone |
| First Pressing Force | 2 tons |
| First Pressing Dwell Time | 6.0 seconds |
| Second Pressing Force | 2 tons |
| Second Pressing Dwell Time | 1.5 seconds |
| Cooling Press Air Pressure | 40 psi |
| Cooling Press Temperature | Room temperature |
| Cooling Press Force | 1 ton |
| Cooling Press Dwell Time | 10.0 seconds |

Example 4

Example 4 presents an example of a one-hit process for fabricating a decorated disk from a plain disk that is 0.03 inches in thickness. The process of Example 4 is the same as the process of Example 2 other than the use of different process parameters. The process parameters of Example 4 are summarized in Table 4 below:

TABLE 4

| | |
|---|---|
| Plain Disk Material | ESSIX Material |
| Plain Disk Thickness | 0.03" |
| Graphic Part Carrier | 0.3 mm glossy PET |
| Graphic Part Graphic | POLYFUZE Material |
| Plain Carrier Material | 0.3 mm glossy PET |
| Heat Press Air Pressure | 60 psi |
| Lower Platen Temperature | 375° F. |
| Lower Die | Crosshatched silicone |
| Upper Platen Temperature | 400° F. |
| Upper Die | Crosshatched Silicone |
| First Pressing Force | 2 Tons |
| First Pressing Dwell Time | 4.5 seconds |
| Second Pressing Force | None |
| Second Pressing Dwell Time | None |
| Cooling Press Air Pressure | 40 psi |
| Cooling Press Temperature | Room Temperature |
| Cooling Press Force | 1 ton |
| Cooling Press Dwell Time | 10.0 seconds |

While a number of embodiments of the present invention have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

What is claimed is:

1. A method, comprising the steps of:
   providing a disk,
      wherein the disk has a first side, a second side opposite the first side, and a profile
      wherein the first side of the disk has a first surface area, and
      wherein the disk includes an FDA-compliant plastic material that is configured to be formed into a dental appliance;
   providing a graphic part, wherein the graphic part includes:
      a first carrier film, and
      a graphic disposed on the first carrier film,
         wherein the graphic has a graphic surface area that is less than the first surface area of the first side of the disk;
   providing a heat stamping press having a lower platen and an upper platen;
   positioning the disk on the lower platen;
   positioning the graphic part on the disk such that the graphic of the graphic part directly contacts a portion of the first side of the disk; and
   heat stamping the disk and the graphic part with the heat stamping press, thereby causing the graphic to fuse into the disk to produce a decorated disk.

2. The method of claim 1, further comprising the steps of:
   providing a first silicone die and a second silicone die;
   prior to the step of positioning the disk on the lower platen, positioning the first silicone die on the lower platen; and
   prior to the step of positioning the disk on the lower platen, positioning the second silicone die on the upper platen.

3. The method of claim 2, wherein at least one of the first silicone die and the second silicone die is textured.

4. The method of claim 1, further comprising the step of:
   prior to the step of positioning the disk on the lower platen, positioning a second carrier film on the lower platen,
   wherein the disk is positioned on the second carrier film.

5. The method of claim 1, wherein the profile of the disk is one of circular or square.

6. The method of claim 1, wherein the graphic comprises an FDA-compliant olefin-based resin.

7. The method of claim 1, further comprising the steps of:
   after operating the heat stamping press to produce the decorated disk, positioning the decorated disk in a cooling press; and
   operating the cooling press to cool the decorated disk.

8. The method of claim 1, wherein the graphic surface area is between 50% and 70% of the first surface area of the first side of the disk.

9. The method of claim 1, wherein the step of operating the heat stamping press includes operating the heat stamping press in accordance with a set of operational parameters, and wherein the set of operational parameters includes:
   a temperature of the lower platen, wherein the temperature of the lower platen is from 150° F. to 400° F.,
   a temperature of the upper platen, wherein the temperature of the upper platen is from 350° F. to 600° F.,
   an air pressure, wherein the air pressure is from 50 to 70 psi, and
   at least one dwell time, wherein the at least one dwell time is from 0.1 second to 10 seconds.

10. The method of claim 9,
    wherein the at least one dwell time includes a first dwell time and a second dwell time, wherein the first dwell time is longer than the second dwell time, and
    wherein the method further comprises the step of inverting the disk and the graphic part between operating the heat stamping press for the first dwell time and operating the heat stamping press for the second dwell time.

11. The method of claim 10, wherein the first dwell time is in a range of from 5 seconds to 10 seconds, and wherein the second dwell time is in a range of from 1 second to 5 seconds.

* * * * *